INVENTOR
ALFRED F. LEATHERMAN
BY Denbigh S. Matthews
ATTORNEYS

INVENTOR
ALFRED F. LEATHERMAN
BY Denbigh S. Matthews
ATTORNEYS

INVENTOR
ALFRED F. LEATHERMAN
BY Denbigh S. Matthews
ATTORNEYS

INVENTOR
ALFRED F. LEATHERMAN
BY Denbigh S. Matthews
ATTORNEYS

INVENTOR
ALFRED F. LEATHERMAN
BY Denbigh S. Matthews
ATTORNEYS

INVENTOR
ALFRED F. LEATHERMAN

BY Denbigh S. Matthews
ATTORNEYS

INVENTOR
ALFRED F. LEATHERMAN
BY Denbigh S. Matthews
ATTORNEYS

United States Patent Office 3,526,708

Patented Sept. 1, 1970

3,526,708

MAGNETIC THROUGH-FIELD APPARATUS AND PROCESS FOR PRINTING BY IMBEDDING PARTICLES IN A RECORD MEDIUM

Alfred F. Leatherman, Upper Arlington, Ohio, assignor, by mesne assignments, to William C. Heller, Jr., Milwaukee, Wis.

Filed Nov. 9, 1965, Ser. No. 506,960
Int. Cl. B41m; G01d *15/12*
U.S. Cl. 178—6.6 38 Claims

ABSTRACT OF THE DISCLOSURE

A printing method and apparatus employs a high frequency magnetic through-field of high strength for effecting permanent lodging of pulverized magnetic particles on ordinary paper in a simple one step operation. The strength of the magnetic field is several times the value required for simple transfer deposit of magnetic particles. The field is concentrated by use of an edged field plate to facilitate providing the desired field strength. Numerous embodiments for practicing the invention are disclosed.

This invention relates to apparatuses and processes for magnetic printing, impregnation, coating, duplication and so forth.

Technical progress of recent years has seen the development of many printing and reproduction techniques that have considerably broadened the original work of Gutenberg. Methods finding modern favor offer processes that are dry, fast, and economical.

The formation of marks and written characters has received considerable attention in recent decades and some processes have been developed to relatively advanced points. Among the handicaps to any printing or impregnating process is that if the process is wet, a drying stage must be incorporated. If dry, a means must be found for melting by heat, hammering, softening by vapors, or otherwise causing the powders to become fixed to the paper, plastic, etc. These treatments normally must be carried out after forming the mark, and therefore special care is required not to smudge or disturb the pattern. This requirement can call for appreciable consumed time and/or space in the process. Disadvantages of time and cost are also involved if it is necessary to apply heat to the otherwise finished material to accomplish fixing.

It is apparent that wet or dry printing or impregnating processes of the past have met with considerable disadvantage. One process that has been used for certain printing or coating tasks to overcome some of the disadvantages of the prior art is the electrostatic process.

Several problems arise in the area of electrostatic processes. Large black areas are not always amenable to reproduction capable of distinguishing these black areas from the background. The electrical insulation characteristics of paper and plastics permits such things as latent images in electrostatics but also cause distortion of the electric field to produce distorted copy. Handling of the materials, or operation of the machinery, also can produce electric charges by "friction" at undesired places possibly resulting in background problems. Atmospheric humidity may have an adverse effect on the operation of electrostatic methods. Some electrostatic methods require sensitive image plates and other fragile devices that can become scratched and worn with direct adverse effects on results. In addition, electrostatic equipment requires higher voltages than that available from ordinary transmission lines.

It is an object of this invention to provide methods for printing or impregnating wherein printing or impregnating is done instantly without need for a subsequent fixing stage.

It is another object of this invention to provide methods for printing or impregnating wherein printing or impregnation is done instantly to firmly embed the print in a receiving material in a permanent manner.

It is still another object of this invention to provide a process for reproduction of printed matter wherein the detail of the light and dark areas of the original is defined accurately on the copy.

It is yet another object of this invention to provide apparatus for printing or impregnating that are not dependent on electrostatic or magnetic image plates or other fragile elements.

These and other objects and advantages of the present invention will become more apparent to those skilled in the art from the following detailed description and claims taken in connection with the accompanying drawings, wherein like components in the several views are generally identified by like reference marks, in which:

The method and apparatus described herein for printing on paper provide a dry magnetic printing process in which the printing and fixing stages preferably are carried out "instantly," dry, and without heat. The apparatus can be used simultaneously to establish the mark initially and to fix the mark in place without need for special handling, time or space requirement. The process is also applicable to printing on thermoplastic and many other materials. In printing on plastic, paper, ceramics, metal, etc., feasible means are available by which the dry "ink" (magnetic particles) can be heated if necessary during the process, to facilitate fixing.

The present process can eliminate blocking and offset problems, solvent, base, or chemical carrier and so forth. In application to printing of plastics, it also is not necessary to treat the surface by corona, gas flame, etc., as required by many of the existing methods of decorating.

Figure 1:
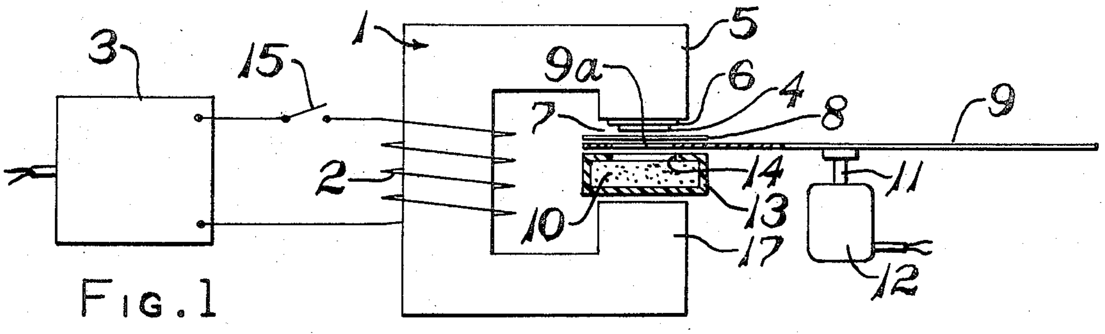
FIG. 1 is a schematic diagram partially in cross section showing an apparatus for magnetic printing and impregnating.
Figures 2, 3, 4, 5, 6, 7, 8, 9, 10, 11:
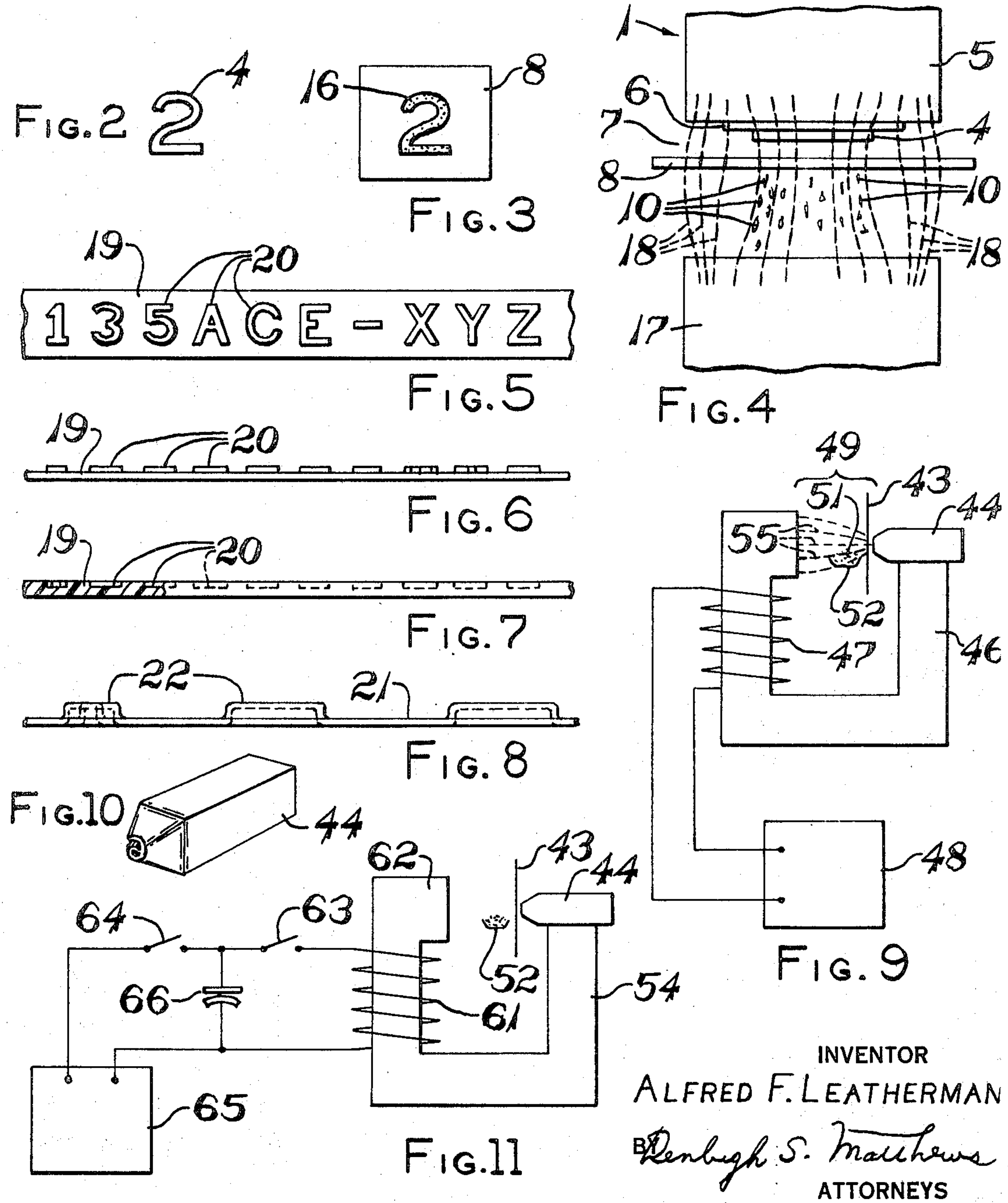
FIG. 2 is a top plan view of indicia, design, pattern and the like used to form magnetic printing.
FIG. 3 is a top plan view of a piece of paper printed by the present method.
FIG. 4 is a view of a portion of the device of FIG. 1 showing the magnetic lines of force and distribution of magnetic particles.
FIG. 5 is a top plan view of a tape bearing ferromagnetic indicia or intelligence.
FIG. 6 is a side view of the tape of FIG. 5.
FIG. 7 is a side view of a modified form of tape in which the ferromagnetic members have an outer surface in the same plane as the matrix of the tape.
FIG. 8 is a tape in which the indicia have been embossed or raised.
FIG. 9 is a vertical diagrammatic view of magnetic printing apparatus in which the magnetic particles are contained in a holder in the air gap.
FIG. 10 is a perspective view of a pole piece bearing indicia on one restricted end.
FIG. 11 is a view similar to FIG. 9 in which a capacitor is used to provide a damped oscillatory discharge current flow in the coil of the magnet.
Figure 13:
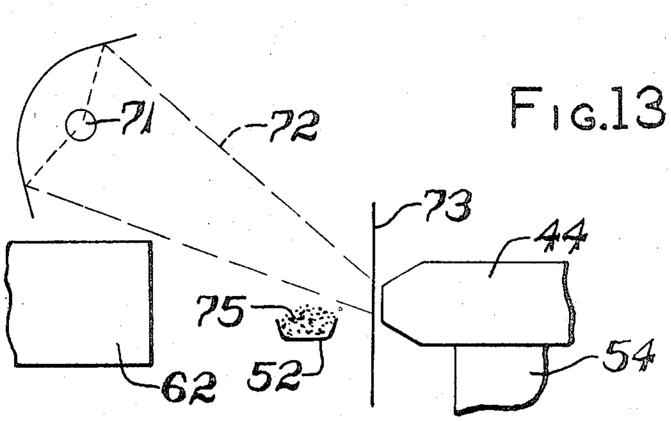
FIG. 13 is a schematic side view of a portion of a magnetic printing device using a radiant heat source.

Referring now to FIG. 1 of the drawings, a laminated iron magnetic core structure 1 is partially wound with a magnetizing winding 2 connected to a source of electric current 3. A "magnetically soft" (unretentive) alloy shaped in the form of a flat cutout arabic numeral "2," designated 4 in the drawing, and shown in FIG. 2, is mounted on the underside of pole piece 5 so as to be within the area defined by airgap 7. In airgap 7 of core 1, adjacent magnetic numeral 4, there is disposed paper, fabric or other nonmagnetic (paramagnetic or diamagnetic) particle-receiving material 8. Positioned also in airgap 7 is container 13 having opening 14 and containing magnetic particles. Container 13 serves as a reservoir of the supply system for introducing magnetic particles into air gap 7. Upon closing switch 15, the current in winding 2 establishes a magnetic field across airgap 7. The field thus formed acts to attract particles from container 13 so as to bring said particles into contact with the lower surface of particle receiving material 8. The presence of magnetic numeral 4 within the space defined by airgap 7 causes a larger number of magnetic particles to be attracted against particle receiving material 8 at those areas directly in line with and corresponding to the shape of magnetic numeral 4 than are attracted at other portion of particle receiving material 8. Furthermore, the force of attraction is greater at said areas than elsewhere on particle-receiving material 8. Upon deenergizing core 1, and examining particle-receiving material 8, it is found, when the proper apparatus and process is used, that a permanent printed character 16 of FIG. 13 is formed on material 8 corresponding to the shape of magnetic numeral 4. The permanent nature of the printed character has been found to be a result of the acceptance of the magnetic particles into the interstices, or openings between fibers, of the particle-receiving material. Thus, the openings and the particles should be of such relative size as to permit the acceptance action to take place.

In the embodiment of the invention illustrated in FIG. 1, the release of particles 10 from supply chamber 13 is controlled by means of a shutter 9 positioned adjacent particle-receiving material 8 in airgap 7 of core 1. Shutter 9 contains one or more openings *9a* to permit passage of the magnetic particles 10 to the surface of particle-receiving material 8. As shown, shutter 9 is mounted on shaft 11 for rotation by motor 12. Openings 9a of shutter 9 and openings 14 of container 12 should be about the same size so as to define the general area to be printed and of a size at least sufficient to cover the dimensions of magnetic numeral 4 of FIG. 1. The areas of shutter 9 intermediate openings 9a should be sufficient to seal off opening 14 to prevent escape or loss of particles 10 from container 13.

The source of electric current 3 may be a variable-current power source. By variable current power source, it is meant to include currents that are alternating, transient, impulse or oscillatory. When frequencies of 10 to 500,000 cycles per second are used, the magnetic particles are driven into the paper, fabric, etc., to remain permanently embedded therein.

It is clear that considerable variety is possible in the practice of the invention. For instance, the opacity of the mark can be varied by using magnetic fields of various intensities. The positioning of numeral 4 in the airgap can assume many forms such as loose, or attached to pole 5 by means of an adhesive layer 6 of FIG. 1, clipped in place, or brazed, soldered, or welded to pole piece 5.

The material of numeral 4 of FIGS. 1 and 2 is not restricted. Magnetic or magnetizable materials, ferromagnetic alloys, and the like, can be used. Numeral 4 can be replaced by collection of inserts of iron or other magnetic material defining a message, word, sentence, and so forth, which it is desired to print or reproduce. Also, it is believed that under suitable circumstances, numeral 4 can be paper, cloth, or plastic and the like which has been printed with a magnetic ink (an ink containing magnetic particles and a binder such as an air-drying or heat-drying oil, resin, or plastic).

Core 1 of FIG. 1 has been discussed as being magnetically energized by means of winding 2. Another form that core 1 could take is that of a permanent magnet outfitted with a shunt magnetic circuit the reluctance of which could be varied so as to achieve a variable magnetic field in airgap 7 when desired. An example of such practice is found in focussing devices used for television picture tubes. In the application being discussed here, the variable reluctance would probably be motor-driven, instead of manually adjustable as in television practice, so as to achieve higher frequencies of variation.

The paper, fabric, or other particle-receiving material 8 in airgap 7 can, instead of a single piece, be in the form of a web which is withdrawn from a supply roll, passed through the airgap, and rewound on a take-up roll after being marked, printed, or impregnated. The supply and take-up rolls are not shown since means for delivering and removing paper or other webs from processing means are well known.

Magnetic particles of barium ferrite or carbonyl iron have been used. The use of other finely divided magnetic or ferro-magnetic materials such as iron oxide, powdered cast iron, etc., will be apparent to those skilled in the art.

The structure materials which comprise shutter 9, container 14, or other devices which can be employed in airgap 7 to control particles 10 are preferably constructed of nonmagnetic (paramagnetic or diamagnetic) materials to avoid adversely affecting the configuration of the magnetic field. Examples of materials suitable for these structures are rigid polyvinyl chloride, acrylonitrile-butadiene-styrene copolymer, a polyester-glass or epoxide-glass fiber composition, ceramic, wood, and in some cases aluminum or brass, and so forth.

It will be appreciated that airgap 7 between pole piece 5 and pole piece 17 of FIG. 1 should be of small vertical dimension, but gaps of various dimensions will be satisfactory depending on the apparatus disposed in the airgap and the results to be desired. Moreover, excessive amounts of current or power are not required to obtain printing or impregnation, and when a lesser degree of penetration is desired, the output of the electrical supply can easily be reduced in intensity by means well known to the art.

The present invention thus provides means for controlling the degree of penetration or impregnation of the particles with respect to the particle-receiving material to provide an inherently indelible impregnated mark in a dry process without heat. Further, means are discussed to control and select the general areas to which the particles are applied and received. If the particle-receiving material is pulled through the magnetic field developed while the current remains on, the magnetic force will continue to vibrate the magnetic particles, and pull or drive them into the particle-receiving material so that the present process is not only useful for printing but also for impregnating and treating various materials with finely divided magnetic particles or particle mixtures. When it is desired to make abrasive papers containing iron oxide particles, for example, element 4 may be a simple solid square or bar to treat a wide area or complete width of particle-receiving material by scanning, or element 4 can be eliminated. Or, if a design is to be printed, element 4 may be of other shape than shown in FIG. 2. Moreover, the action of the magnetic field in the airgap tends to collect loose magnetic particles into an organized pattern corresponding to the shape of element 4 or the shape of the field, so that special apparatus and operations to blow, brush, shake, or dust off excess powder from the paper after the marking operations are reduced or eliminated.

Shutter 9, instead of being rotated as shown in FIG. 1, can by suitable mechanism not shown be oscillated or even reciprocated in the plane of the web or paper 8 by means of solenoids, etc. It may be preferred in some cases to control the application of the particles 10 by selectively energizing and deenergizing core 1 in intermittent fashion without the need for a shutter so as to effect control of the application of the particles 10. Thus, although shutter 9 of FIG. 1 can provide a convenient means for preventing unnecessary deposition of particles, it has been found in practice that satisfactory definition is obtained without the aforesaid shutter. For example, a core corresponding to core 1 of FIG. 1 and comprising a bonded lamination structure of the "Hipersil" (trade name of Westinghouse Electric corporation) type and having a cross section of approximately 2" by 3" was wound with 100 turns of insulated copper strip. The winding was connected to a power supply comprising a 220-volt 60-cycle power line. A magnetic numeral corresponding to 4 of FIG. 1 was cut from a sheet of 0.004-inch-thick, high-permeability heat-treated nickel alloy of about 18Fe, 75Ni, 2Cr, and 5Cu, and was about 1 inch in largest dimension. A folded paper sprinkled with ground barium ferrite magnetic particles was placed in the airgap of the core defining a space of about 0.040 inch along with the cutout numeral. Upon energizing the core, a few amperes of 60 cycle current were drawn from the power source. After a period of 30 seconds it was found that an indelible printed character corresponding to the shape of the magnetic numeral had been formed. Under the same conditions as herein above described for barium ferrite, magnetic particles of carbonyl iron produced a permanent mark of lesser intensity.

In still another example of permanent shaped magnetic marking, according to this invention, core 1 of FIG. 1 consisted of bonded thin laminations and was about ½ inch by 1½ inches in cross section. The winding 2 consisted of about 12 turns of water-cooled copper tubing. The power source consisted of an 85 kw. induction heating motor generator set operating at a frequency of 10,000 cycles per second (10 kc.), and operating at about 10 percent of rated output current which would correspond to a power output less than about 1000 watts. Folded paper covered with magnetic particles of barium ferrite was placed in the air gap of the core which defined a space of about 0.030 inch. Application of power for only 1 second produced an image of the magnetic core which could not be erased and which even darkened the reverse side of the paper. On both sides of the paper, particularly the particle-receiving side, there was a sharp line of demarcation between the darkened (printed) and undarkened (or unprinted) portions of the paper. The darkening of the reverse side of the paper was considered to illustrate the abilities of the method to serve in impregnation capacity, and the dark, sharply-defined marking obtained was considered to illustrate the printing capacities of a method of fast, dry, permanent marking without heat.

In some cases it may be preferred to make a mark in which the magnetic particles do not become driven directly into the particle-receiving means. In this case a permanent mark could be made by employing a heat-softenable component with the particles or as a portion of the particle-receiving means, so as to obtain adhesion by the use of heat, or heated magnetic particles could make a mark on a heat-sensitive paper, or could char a normal paper.

The particle-receiving material, paper, fabric (or carrier yet to be described), and the magnetic particles, should be positioned in an asymetric portion of the magnetic field of the air gap so that said particles will be drawn toward the particle-receiving material. This arrangement is preferable because of the principles believed to be involved in the present invention as to be described with the aid of FIG. 4. FIG. 4 represents a portion of the apparatus shown in FIG. 1 (and several subsequent figures) wherein some of the elements have been eliminated and other separated for purposes of simplicity. This principle involves in part the tendency for magnetic flux lines to choose the path of least reluctance in traversing the air gap of a magnet. As shown in FIG. 4, flux lines 18 which are normally distributed somewhat uniformly in core 1 through poles 5 and 17 flow in higher concentration through magnetic numeral 4, paper 8 and powder 10 near the numeral than they do elsewhere in air gap 7. This uneven, although organized, distribution causes powder 10 to be drawn into position directly facing numeral 4, and the alternating or oscillating nature of the magnetic field then vibrates the magnetized powder particles on and into the paper selectively at the location of numeral 4.

In more advanced, mechanized applications of the apparatus of FIG. 1, particle-receiving material 8 can be fed in the form of a web, and the operation of shutter 9 can be synchronized with the formation of the magnetic field by means of a suitable control means used in place of switch 15. Container 13 can be part of a powder supply conduit provided with a storage hopper, air or gas supply, blowers, etc., to deliver the right amount of particle mixture to the operating area. Electrostatic charges may also be used to control the movement of, or to support, the particles in the conduit. Vibratory or sonic means may also be an aid in handling of particles. Likewise, the apparatus of FIG. 1 can be inverted and the magnetic particles 10 can be cascaded from a chute or other container over web 8 as the core 1 is operated.

Instead of fixably or removably securing numeral 4 to pole 5, numeral 4 can be replaced by a web or tape 19 carrying ferromagnetic indicia 20 as shown in FIGS. 5 and 6. Tape 19 can be fed across pole 5 and adjacent thereto in the position of numeral 4 and adhesives 6 as shown in FIG. 1, the indicia being next to paper web 8. The web can be supplied from a roll supported, and wound up on a take up roll in the same manner used for feeding the paper web through the magnetic field. In this manner a series of characters or messages can be printed on the paper web. Web 19 can be synchronized electronically, mechanically, or by other means with web 8 in the manner described above so that both travel at the same speed and web 8 is printed as each character 20 passes under the magnetic fluxing head. The travel of the webs can be intermittent or continuous. Also, one web can travel at different speeds or each can move intermittently at different times so that the indicia printed on web 8 will be closer or farther apart than shown on web 20, one character can be printed on web 8 several time before the next character, or a character can be omitted entirely. Also, means can be provided in the conveying system for handling webs 8 and 19 to reverse as well as stop their travel if desired.

In FIGS. 5 and 6, web 19 is made of a flexible nonmagnetic material to which the characters or indicia 20 made of iron or other magnetic material or alloy, are secured to web 19 by suitable adhesives, or, as in the case of some thermoplastics, the characters may be best pressed onto the web. FIG. 7 shows a modification in which the indicia 20 have been heat-pressed down into the web 19 so that the surface of the web is planar or smooth. Alternatively, the equipment can be used to make light characters on a dark background by substituting a magnetic metal strip, for web 19, in which the indicia or message is punched out of the strip and it is recognized that numeral 4 can be formed in this manner. Moreover, it is possible to use an embossed or stamped thin magnetic metal strip in which the characters or indicia are either raised or lowered. FIG. 8, magnified four times with respect to FIGS. 5, 6, and 7, shows a metal strip or tape 21 which has been stamped to give raised characters or indicia 22. In this case the magnetic field flux will concentrate at the raised portions, causing the magnetic particles to be attracted to the raised portions and deposit on the paper disposed between strip 21 and particles to form the required printed character.

In FIGS. 9, 10, 11, 12, and 13, modifications of the invention are shown which permit substantially larger air gap openings to be used than are preferred in connection with FIG. 1. Referring to FIG. 9, paper 43 (edge view) upon which printed charatcers are to be made is located close to or in contact with a magnetic type face 44 such as shown in perspective view in FIG. 10. Typeface 44 is arranged to serve as a part of magnetic core 46 which is provided with winding 47 energized by power supply 48. The power supply provides current flow to coil 47 so as to produce a corresponding magnetic field in air gap 49 and paper 43. To make a printed character, magnetic powder 51 for convenience placed into reservoir or holder 52 near the type-face 44, but separated from it by paper 43. Upon energizing winding 47, a quantity of powder 51 is attracted toward type-face 44 because the magnetic flux lines 55 are more concentrated at that area, particularly at the active surface of type-face 44 upon which the shaped type is present. The attraction and powder movement takes place very rapidly, beyond the ability of the eye to follow. The powders stirke the paper and simultaneously form into the pattern determined by the typeface. Where a variable magnetic field is present, some of the powder is immediately impregnated or imbedded into paper 43 in the desired pattern.

In practice, it has been found that the type-face 44 of FIG. 9 can be a steel stamping die as shown in perspective in FIG. 10. The apparatus of FIG. 9 has been used employing the numeral "6" as shown in FIG. 10 since it illustrates a closed loop. Upon energization with a 60-cycle electric current, the numeral 6 has been found to be accurately reproduced.

In FIG. 11 there is shown an apparatus employing capacitor-discharge techniques. An oscillatory transient current flow is realized in winding 61 (and consequent oscillatory magnetic flux in core 62) by first opening switching device 63 and then closing switching device 64 so as to permit power supply 65 to deliver electrical energy to storage capacitor 66. A D-C power supply is used, but the type of electrical power supply is not restricted. When electrical energy of the desired level corresponding to the design of coil 61 has been stored in capacitor 66, switch 64 is opened and switch 63 is closed to cause the capacitor to deliver its energy to coil 61. As well known in the electrical art, easily realized design conditions then result in a damped oscillatory discharge current flow in the circuit of capacitor 66 and coil 61. It is apparent that the apparatus can be modified to deliver greater voltage to the capacitor and that electronic or other high speed switching can be used to decrease the time. Also, synchronizing means can be used to synchronize the magnetic pulses with the feed of the paper past type bar 44.

Figure 12:
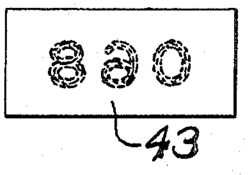
FIG. 12 is a top plan view of a magnetically printed piece of paper using the apparatus of FIG. 11.

In the apparatus shown in FIG. 11, 3 magnetic type faces (44) having the numerals "8," "6," and "0" were mounted on pole 54. By charging capacitor 66 to about 300 volts, the resultant oscillation produced the printing on paper 43 as seen in FIG. 12.

In FIG. 13 is shown a modification of the apparatus shown in FIG. 11. A radiant heat source 71 is mounted adjacent the core and directs its beam 72 toward type face 44. In place of paper 43, a thermoplastic sheet or waxed paper 73 is used. Radiant heat source 71 serves to soften thermoplastic sheet or waxed paper 73 to cause magnetic powder to become imbedded therein upon striking the same. In place of radiant heater 71, other types of heat sources could be used to soften material 73 to be marked upon including the use of ovens, directed flames, etc. Further, heating to a temperature sufficient to soften the surface of 73 need not be done with material 73 in place as shown in FIG. 13 but could be done prior to the printing step, for example, as part of a moving process.

The magnetic type faces 4 and 44 of FIGS. 1, 4, 9, 11 and 13 need not be used in the larger magnetic circuit as shown but can be individually supplied with magnetizing windings if desired without the magnetic flux return structure shown. Also, as shown above, it is not necessary to use a complete stamping die or type-face for each separate character. Moreover, the seven-segment form of character which is employed in digital readouts can be used with appropriate switching to magnetize seven separate core segments (an eighth segment is used for a decimal point).

The methods previously described show portions of apparatus located on both sides of the material to be printed upon. However, in the method of the present invention the printing operation can be accomplished from one side of the material. For example, printed information can be applied to closed packages, solid objects, containers with small necks, etc. Preferably, the apparatus is arranged to avoid contact between the magnetic character forming face and the magnetic particles to avoid the necessity for cleaning the magnet face and to insure the application of more uniform pressure to the body being printed.

Figures 14, 15, 16, 17, 18, 19:
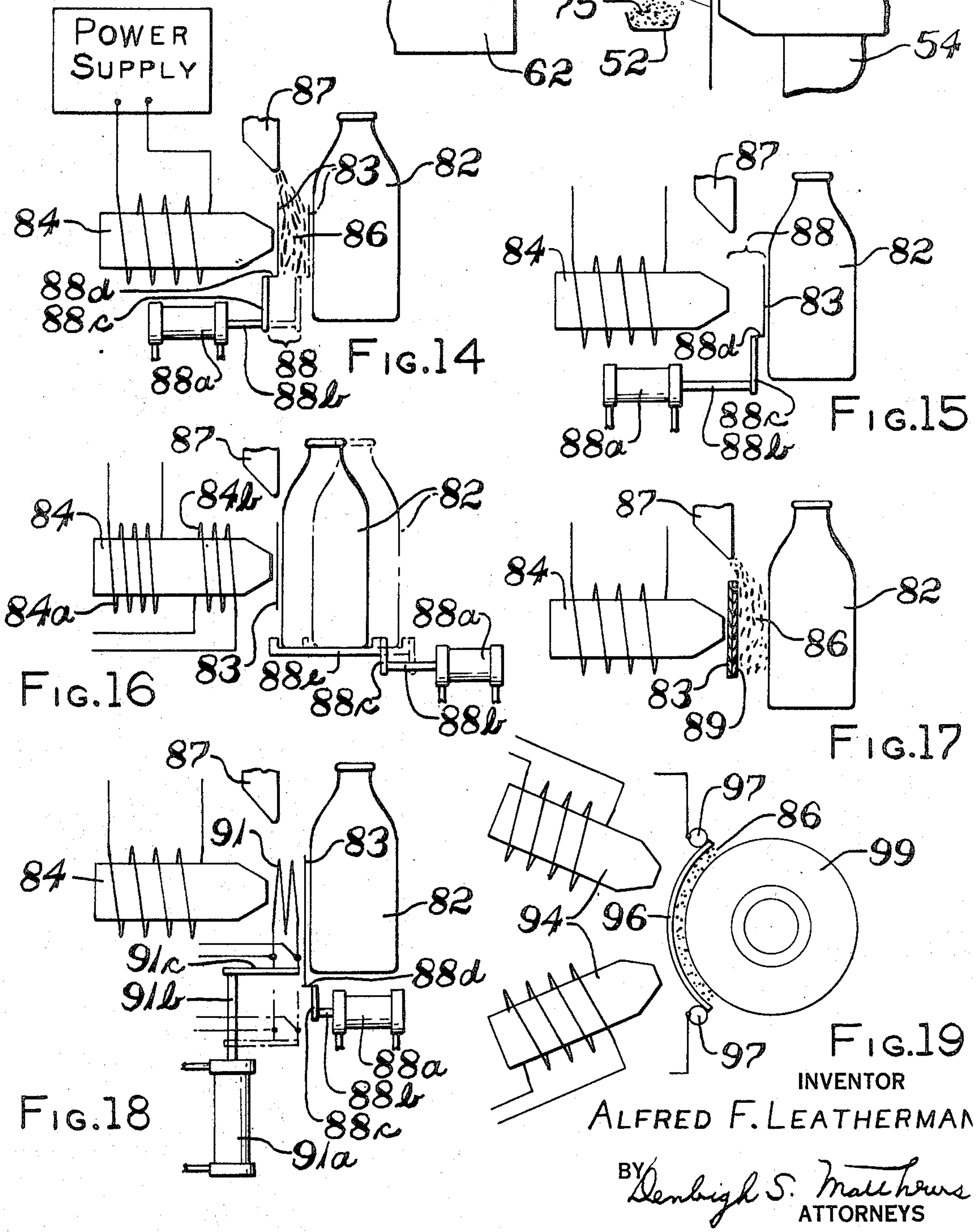
FIG. 14 is a schematic diagram of a magnetic printing device using a carrier for transfer of the magnetic pattern formed.
FIG. 15 is a schematic diagram showing the carrier of FIG. 14 being applied to print the surface of a bottle.
FIG. 16 is a schematic diagram showing the bottle to be printed moving to the carrier.
FIG. 17 is a schematic diagram in which a film on the carrier contains the magnetic pattern and is then applied to the bottle.
FIG. 18 is a schematic diagram in which an induction heating element is disposed in the air gap adjacent the carrier.
FIG. 19 is a schematic diagram, top view, in which the carrier is of stainless steel and can be supported by conductors for heating the carrier and magnetic pattern.

As shown in FIGS. 14 to 16, the object or product 82, such as polyethylene milk bottle, to be printed upon is of a rigid or semi-rigid type or can be momentarily pressurized with air or filled to make it so, and is held in position by conventional apparatus. A thin strip of metal, plastic, or other suitable material 83 that can be called a carrier, is positioned vertically between object 82 and magnetic field source (magnet 84) and outfitted with mechanical equipment to hold it in the desired position. Carrier 83 is made of austenitic stainless steel, Teflon, rubber, plastic or other nonmagnetic material that will not disturb the magnetic flux lines. The carrier can be rigid or flexible, taut or slack, and flat or contoured to match a product surface. The magnetic field source 84 carries a letter, symbol or other indicia on its face adjacent carrier 83. The field source 84 is energized by means of a coil and power supply, providing direct current, alternating, or oscillatory current flow, in one of several manners as previously described.

Between carrier 83 and product 82, a cloud, shower, spray, or curtain of suitable dry magnetic powder 86 from supply container 87 is maintained either continuously or intermittently so as to supply the "ink" (magnetic particles) to the system.

Upon energizing the power supply and establishing a magnetic field in field source 84, some of the powders of cloud 86 are attracted toward field source 84 and become collected in an organized manner against the surface of carrier 83. Next, carrier 83 is moved rapidly to cause it to press against object 82 as shown in FIG. 15. The amount of carrier motion required will depend on the dimensions of air gap 88 of FIG. 15 and can be quite small for rapid operation. The carrier can be moved by means of fluid (air or liquid) actuated cylinder **88*a* having piston rod 88*b* bearing arm 88*c* connected by lip 88*d* to carrier 83**.

The organized pattern of particles on the carrier can be held in place by natural adhesion or by maintaining the energization of field source 84 during the motion of carrier 83. Alternatively, object 82 can be moved rapidly against carrier 83 containing the organized pattern of particles to press the particles against the object as clearly shown in FIG. 16. Here, fluid actuated cylinder **88*a* containing piston rod 88*b* is connected to arm 88*c* which accordingly can move bottle holder 88*c*** which can be part of a bottle conveyor system.

With members in the positions of either FIG. 15 or 16, the organized pattern of particles is transferred onto the product by several possible techniques. For example, where the surface of the object 82 has been previously prepared with a "tacky" coating in the area to be printed upon, the organized pattern of particles will stick to object 82 upon return of members 82, 83 and 84 to the "open" position of FIG. 14, completing the cycle of a printing operation. In a modification of this approach as shown in FIG. 17, a visibly transparent or translucent film 89 contacts carrier 83 on the side opposite field source 84 prior to formation of the pattern of magnetic particles. The film is held and supplied by means known in the printing art. On energization of field source 84, magnetic particles 86 will form an organized pattern on film 89 held against carrier 83. Carrier 83 then moves to object 82 or vice versa as shown in FIGS. 15 and 16. Film 89 having the organized pattern of magnetized particles then sticks to the tacky surface of object 82 upon being pressed against it by carrier 83, to result in a waterproof, smooth, protective cover for the final copy if desired. Such a film, desirably pre-cut could instead be applied as a subsequent step if desired, and might be sprayed or applied by curtain coating as known in the packaging art, or the film could be cut at the time it is applied to the product. In a further alternative, a pre-gummed film is placed on carrier 83, the gummed side positioned to receive the organized pattern of magnetic particles. The pattern is then formed on the gummed surface which gummed surface then also serves to hold the film in place on object 82, which no longer would need to be pregummed itself. In the approaches just discussed, carrier 83 does not need to be made of any particular material so long as it does not disturb the magnetic flux lines. It could be metal, plastic, cloth, wood, ceramic, etc.

In using a pre-gummed film (89) or pre-gummed object (82), it is preferred to employ one or more shutters as shown in FIG. 1, and discussed above, in the air gap to avoid formation of background on the film or object from the cloud of particles before the field source has formed and organized the particles into a pattern on the carrier or film. The shutters are supported in a manner to move in and out of the air gap so that they are placed in operating position during formation of the cloud and organized pattern and then are moved out of the air gap when the carrier 83 or object 82 are moved to transfer the pattern to the object 82. Alternatively, the particles 86 can be injected into the air gap parallel to but positioned away from the carrier 83 and film 89 as well as object 82 with the simultaneous energization of the field source. In this way premature adhesion of the particles to the pre-gummed film and/or object can be avoided.

With carrier 83 constructed of an electrical non-conductor which also does not disturb flux lines, having a smooth surface and capable of operation at elevated temperatures such as Teflon, Teflon-coated, silicon rubber, or resin coated fiberglass, the organized pattern of magnetic particles may be permanently printed as follows. With the previously discussed members in position, as in FIG. 15 an induction heating coil is introduced into air gap 88 to provide the arrangement shown in FIG. 18 in which heating coil 91 is shown in a representative position for use. Induction heating coil 91, of course, is connected to a suitable well known induction heating power source not shown. Fluid actuated cylinder 91*a* contains piston rod 91*b* connected to arm 91*c* supporting coil 91 to move the coil in and out of the air gap for the purposes of heating. Using the desired combinations of magnetic particle types and frequency of induction heating energy, rapid controllable rates of heat generation can be provided directly in said particles. Thus upon energizing induction heating coil 91, heat is generated in, and only in, the organized pattern of particles themselves which are pressed against object 82 by carrier 83. Further pressure can be achieved, if desirable, by arranging for coil 91 to press against the back of the carrier 83. Where product 82 is made of thermoplastic material such as polyethylene, polyvinyl chloride, nylon, saran, etc., the generated heat will soften and/or partially melt the surface of object 82 selectively at the desired regions exactly at the areas of the pattern, causing the plastic to flow or soften and form a bond with the particles or permit the particles to become imbedded in the surface. Then induction coil 91 is de-energized permitting the printed surface of the product to return to the solidified state. If desirable, the induction coil 91 can be cold water cooled and when resting against the rear face of the carrier can assist this cooling action. Alternatively, cool air blasts can be used, or the cooling can be done in a subsequent step if necessary. However, in some instances upon de-energizing the coil, cooling will occur very rapidly by itself with, or without, the members remaining in place as shown in the figures. When carrier 83 is used for elevated-temperature service, it is made of or coated with materials such as Teflon, silicones and others well known in the art which avoid sticking of the carrier to object 82 when the step is undertaken to restore the various members to the "open" position to complete the process or for starting a new printing operation as shown in FIG. 14.

With object 82 of glass, paper, wood, or the like, a hot-melt or plastic coating preapplied to object 82, or mixed in or coated on particles 86, could be employed to achieve sticking. Hot-melt material mixed in the particles, or preapplied to the product, also permits permanent marking of metal objects by using induction coil 91 to generate heat in the product as well as particles. In a modification of the method and apparatus shown in FIGS. 14 to 18, induction coil 91 could be eliminated by arranging the members as in FIG. 16 and modifying magnetizing field source 84 by means of a coil 84*a* for magnetic flux and a coil 84*b* for high-frequency current to use the source as a magnetic core to channel the generated high-frequency flux into the magnetic particles to heat them. Where the temperature of the field source may become too high due to the high frequencies required for directly heating particles 86 where object 82 is nonmetallic, it will be desirable to make the field source of ferrites rather than iron or steel. However, when product 82 is a metal, lower induction frequencies can be used that would sufficiently heat product 82. It would then heat the particles-hot-metal mixture, or soften a hot-melt pre-coating on product 82 without overheating field source 84 to require delay for cooling or the use of extra cooling means.

In another embodiment of the present invention, a carrier consisting, for example, of a strip of stainless steel, is heated by passing an electric current through it, before, during, and/or after the particle pattern had been formed on it magnetically. It could also be heated by a gas flame or other source before moving into the magnetic field. Such an arrangement is shown in FIG. 19. The equipment of FIG. 19 is arranged in a manner corresponding somewhat to FIG. 15, but shown in a top view. One or more field sources 94 function to create the initial organized patern(s) of magnetic particles 86 on the working face of carrier 96 as before. Carrier 96, however, is outfitted with current-carrying members 97 that can also serve to support and move the carrier. During the process, current is passed through the current-carrying supports 97 and through carrier 96 so as to heat it by self-resistance heating. The pattern of particles containing a hot-melt constituent or coating (colored if desirable) on carrier 96 becomes softened by heat conducted from carrier to particle pattern. The softened particle-pattern is then pressed against rigid or semi-rigid surface of object 99 (a bottle as shown) to which it would stick. Carrier 96 can be constructed with a thin layer of a high temperature resisting non-sticking coating such as Teflon, a silicon resin or rubber or other agent to promote release of carrier 96 from the particle pattern and from object 99. Prior, during, or after release, the carrier could be de-energized to permit it to cool. Cooling could be assisted by air blasts or other means such as chill rolls. The carrier can remain heated at all times, if desired, during a rapid continuous process since it should be in contact with the surface of object 99 only momentarily so that only the outer surface layers of object 99 will be softened. Likewise, the composition of a hot-melt plastic or resin and magnetic particles should remain on the carrier only sufficiently long to form the pattern which is almost instantaneous and to soften the plastic rather than cause it to melt and run to distort the pattern.

The particles need not contain a hot-melt constituent when printing on thermoplastic products or thermoplastic-coated products. The heat of the carrier can function to soften the outer surface area of object 99 against which it presses, or rests, to cause it to become tacky and to hold the particles which then become firmly a part of the object 99 upon cooling.

An apparatus arrangement similar to that of FIGS. 10, 11, 14 and 15 was used and comprised a laminated magnetic core with coil windings connected to a capacitor-discharge power source having one pole in the form of a type-face or metal die bearing the number "6" attached to the core. A non-magnetic polished stainless steel (17–7PH) sheet (0.006" thick) was used as the carrier since a magnetic sheet would seriously disturb, or prevent, the desired pattern since the flux lines of the type-face would tend to spread and flow lengthwise in the sheet. On charging the power supply to 2000 volts and discharging while the stainless steel carrier was adjacent the type faces in the presence of barium ferrite particles, the particles were formed in the pattern of a "6" on the sheet. On slightly jarring the sheet excess power could be removed leaving a sharp opaque image. However, it was possible to hold the sheet in any position without affecting the pattern or image, and it appeared that adhesive forces and/or compaction effects among the magnetized or organized particles themselves were holding the pattern in place. The carrier with the pattern on the inside was then bent around a polyethylene bottle without disturbing the pattern. A gas flame was played on the outer surface of the carrier for a few seconds and removed, and the assembly allowed to cool. After cooling, the carrier was removed from the sheet and practically all of the pattern had been transferred to the surface of the bottle. A trace amount of patterned particles remained on the sheet and was removed easily by wiping. While some of the particles on the bottle were loose and could be washed away, a substantial portion remained indented and bonded in the outer surface of the bottle forming a good print which could not be removed without defacing the surface of the bottle.

In another embodiment of this invention a metal or nonmetal carrier 83 can be used with a heated or hot field source 84. The field source 84 can be heated by any means to elevated temperature and can remain so during printing since the elevated temperature has little or no effect on the magnetic functioning of field source 84 which would be essentially as previously described. Magnetic patterns would be formed with equipment arranged as in FIG. 14 and would be then moved into the position of FIG. 16. With ordinary magnetic particles, hot field source 84 would now serve to supply heat to and through carrier 83 to heat particles 86 and the thermoplastic surface of object 82 to cause the particles to stick to the object 82. It is desirable in this instance to assure that some force is established between field source 84, carrier 83 and object 82 to assure good transfer of heat from source to object.

With particles in a hot-melt mixture or with coated particles, the heat transmitted from field source 84 as used above to carrier 83 in FIG. 14 would cause carrier 83 to be warm, thus causing the deposited pattern to become warm and to soften before transferring the pattern. With a pre-softened pattern such as this, the equipment need not always move into the position of FIG. 16, but can also function as in FIG. 15. The softened pattern does not depend on the product being thermoplastic, or coated with thermoplastic, to achieve sticking so that the method is applicable to marking or printing on board, paper, wood, metal, ceramic, etc.

In a further embodiment of this invention using a metal carrier such as one of stainless steel, carrier 83 is heated locally at the area of the pattern of magnetizable particles and facing the local region of object 82 to be printed upon, by use of induction heating of carrier 83. In one arrangement, field sources 84 would serve as cores of an induction heating coil as mentioned previously in connection with use of this technique for induction heating areas of a metal product. In this particular case, however, carrier 83 would be induction heated locally by virtue of its being present in the concentrated induction heating flux at the active end of field source 84. The induction heating flux can be superimposed on the flux required for collection of the magnetic particles or the induction heating flux can serve simultaneously to collect the magnetic particles in the organized pattern and to heat the carrier (which heats the particles). The induction flux and magnetic collection flux can be established at different, concurrent, or overlapping time intervals to properly form the organized pattern of magnetic particles and heat them for transfer to and printing or securing them to object 82.

As before, locally-heated carrier 83 serves to heat the particles and thermoplastic object or product 82 to make the particles stick as in FIG. 16. For such products or for products that are not thermoplastic, a hot-melt composite may be used to cause the pattern to become soft upon formation to permit the step of either FIG. 15 or 16 to be carried out. As advantage of this technique is the fact that heat is generated not only locally in the carrier and product but also is generated at all the areas involved in the printing operation.

Since the metal carrier is being heated, the frequency of the induction heating flux may be selected from a broad range because of the optimum (nearly perpendicular) direction of flux with respect to the carrier. Frequencies as low as 1000 cycles and as high as 500,000 cycles are possible to use. The field sources in such case should preferably be made of a material suitable for high-frequency use, such as of ferrite, bonded iron powder, laminations, etc. The field source units of this and previously discussed embodiments can be of sintered or bonded iron powder, obtained by casting or molding to shape. They, also, can be resilient such as "magnetic rubber" to help provide uniform contact with slightly irregular surfaces.

A plurality of field sources 84 and accompanying equipment as shown in FIGS. 14–19 can be mounted along a conveyor to print a series of indicia on object 82 as it moves past the various field sources. Alternatively, the pole face of field source 84 facing the object can be smooth and a tape passed in front of it as shown in FIGS. 5–8.

Figures 20, 20A:
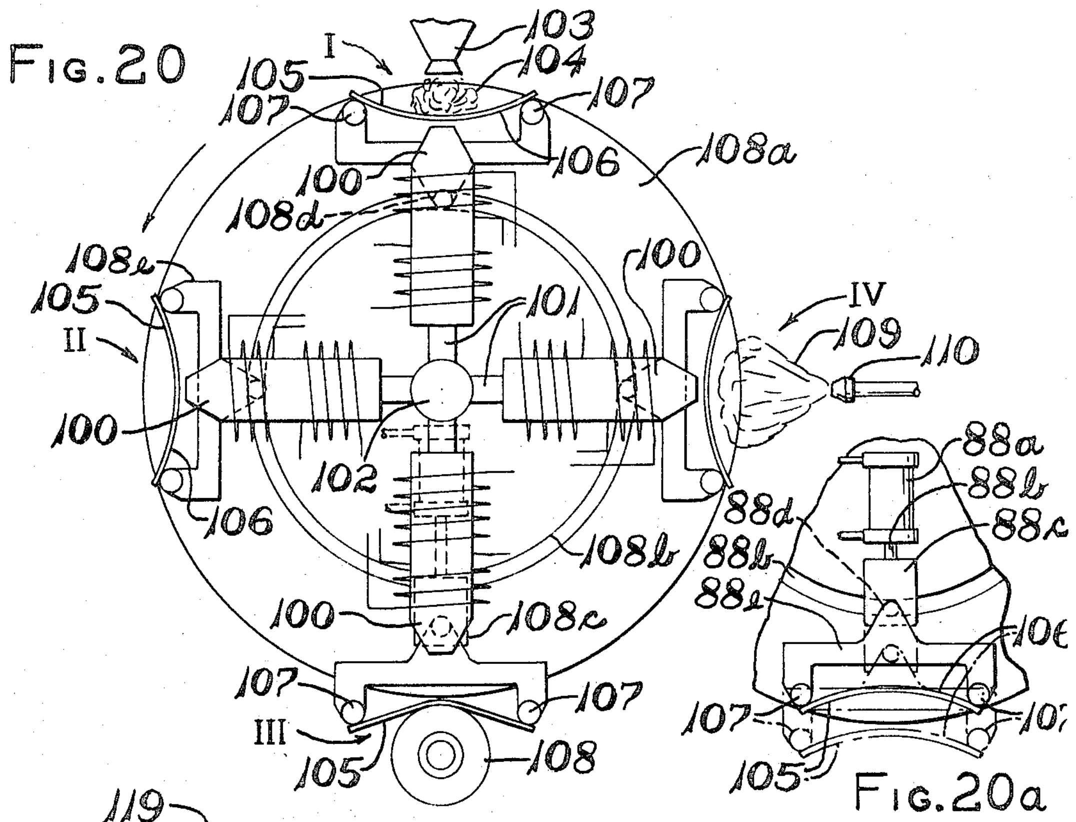
FIG. 20 is a top plan schematic diagram using a rotary magnet and carrier to provide for separate steps of cleaning, forming the magnetic pattern, and printing.
FIG. 20A is an enlarged detailed view of a portion of the apparatus shown in FIG. 20 in the position generally indicated by III.

A further modification of the present invention to provide faster operation is shown in FIGS. 20 and 20A top views, in which the process is carried out in sequential steps to permit temperatures to rise or fall, to permit particles to deposit and to prevent particles or the cloud of particles from depositing on unwanted areas of the equipment. In the figure, the printing equipment is arranged to rotate counterclockwise in 90-degree steps, Four steps are indicated by the numerals I-IV.

In step I, type face or field source unit 100 bearing indicia on its pole face is secured by member 101 to rotary shaft 102. Field source 100 is energized by direct current and supply hopper 103 discharges cloud 104 of magnetic particles adjacent the outer face 105 of carrier 106. Due to the energization and resulting magnetic field, carrier 106 collects a pattern of the particles on its surface. The carrier is outfitted with supports 107 which may be current carrying. Natural adhesion forces or a direct current flux component in field source unit 100 now hold the particles in organized position while rotating and while stopped.

In step II, field source 100 and carrier 106 have been rotated 90 degrees and to the direct current flux of field source 100 (if used) a high-frequency component is added to produce induction heating of carrier 106 which heats the particle pattern on the carrier.

In step III, the field source and carrier have been rotated another 90 degrees, with D-C and A-C still energized, and the carrier rapidly actuated to move it against the product or object 108 (which may be a polyethylene bottle, for example) to press the heated pattern and hot carrier against the product sufficiently to soften the outer surface layers of the plastic bottle and make the pattern stick. The carrier is then retracted and the fields are deenergized by cutting off the currents to field source 100.

As shown in FIGS. 20 and 20A the core and carrier are suitably mounted so that they rotate together around base plate or bed **108*a* containing circular groove 108*b* which is continuous around the bed except for a portion equal to the width of slide 108*c* which contains an arcuate groove continuous with and completing circular groove 108 *b*. Pins 108*d* are connected to yoke 108*e* supporting carrier 106 and ride in groove 108*b*. The yoke is nonmagnetic. In the position indicated by III actuation of cylinder 88*a* moves piston 88*b* to cause slide 108*c* to radially move pin 108*d* out of the groove and yoke 108*e*** to force the carrier against the bottle. Spring means are provided to return the slide to its former position after fluid is released from the actuated cylinder or mechanical linkage is provided to connect with the slide and return it on reversing the action of the cylinder so that the carrier is retracted.

In step IV, field source 100 and carrier 106 have been rotated another 90 degrees, and a blast of air 109 from nozzle 110 is directed against carrier 106 to cool it if necessary and to blow away excess or left-over magnetic particles from the surface of the carrier which might cause background problems. If desirable, at the end of the air treatment, a silicone-type release fluid may be sprayed onto the face of the carrier to facilitate release of the particle pattern from the carrier and release of the carrier from the prdouct. In place of using the air to clean the carrier, a rotary brush or a belt or other means may be used to clean the carrier.

In some instances such as in the use of tapes for computers or cash registers etc. or in publishing operations, a continuous translational motion of the product, such as paper, to be printed, is maintained. The printing procedure of the present invention is adapted to this type of work by incorporating a belt-type or rotary-type carrier.

Figure 21:
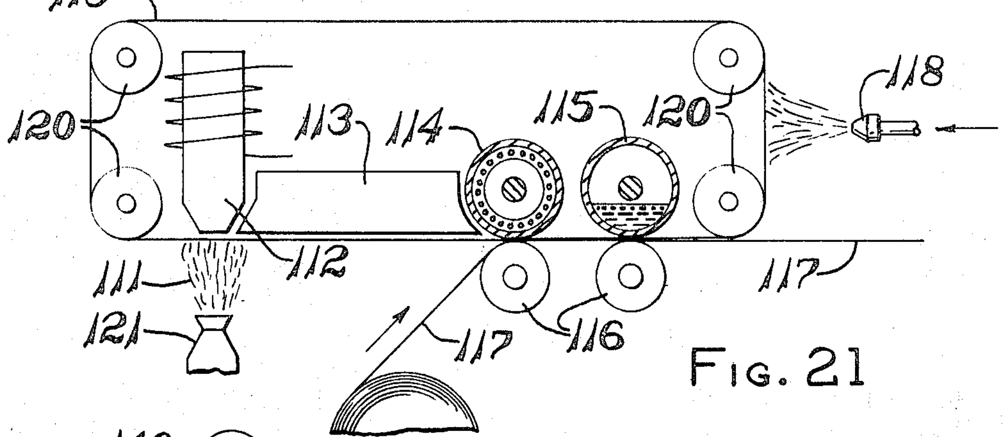
FIG. 21 is a vertical schematic diagram of another embodiment of this invention using an arrangement of apparatus for magnetically printing comprising a belt and a web of paper or other material on which it is desired to print.

A belt-type system of this nature is shown schematically in FIG. 21 in which the magnetic pattern from magnetic particle cloud 111 is very rapidly established by typeface or field source 112, held in place as the carrier belt moves along by D-C magnetic 113, and then heated by heat source 114 (induction or resistance such as resistance heating bars). Cooling device 115 such as a water cooled roller cools the belt and provides a backup for one of the pressure rolls 116 as the sheet 117, such as a thermoplastic sheet or wax coated paper, is printed with the heated pattern. Air nozzle 118 blows away excess powder. The carrier belt 119 is supported and carried by rollers 120. The magnetic particle cloud is supplied from supply source 121. Re-arrangements of the apparatus shown can be made to permit printing both sides of the sheet 117 at once, and other arrangements will be evident to persons skilled in the art.

Figure 22:
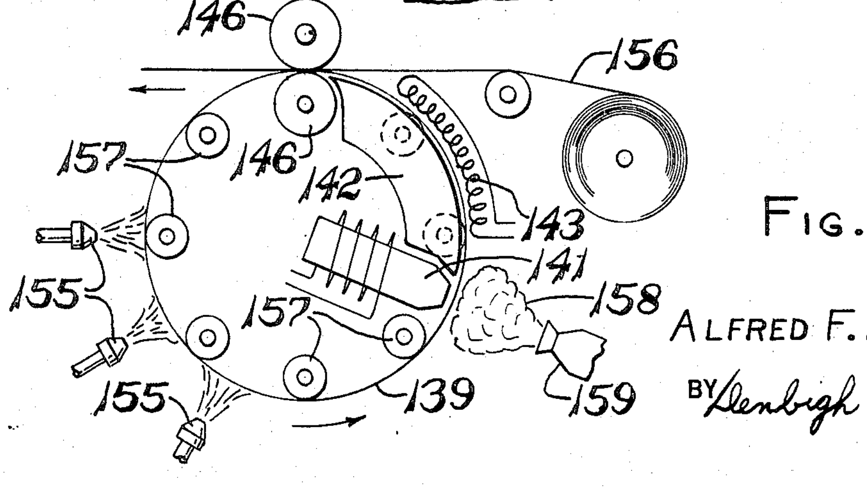
FIG. 22 is a vertical schematic diagram of a further embodiment in which a drum is used to form and carry the magnetic pattern to print on receiving means such as a paper web.

In FIG. 22, a rotating drum carrier 139, rotating counterclockwise, has the magnetic pattern from magnetic particles established by type-face (including type plate, other shaped metal devics, etc.) or field source 141 on the surface of the carrier. The pattern is held in place by D-C magnet 142. The metal carrier is heated by induction heating coil 143 so that hot transfer can be made at the rolls 146. Air nozzles 155 cool the carrier, if necessary, and blow away excess powder. The image is printed on paper or plastic sheet or web 156 as the carrier passes between rollers 146. Rollers 157 serve to also support and drive the drum type carrier. The cloud 158 of magnetic particles such as barium ferrite or iron oxide is supplied to the surface of carrier 139 opposite type face 141 from supply source 159 which can be one of those previously described herein.

Figure 23:
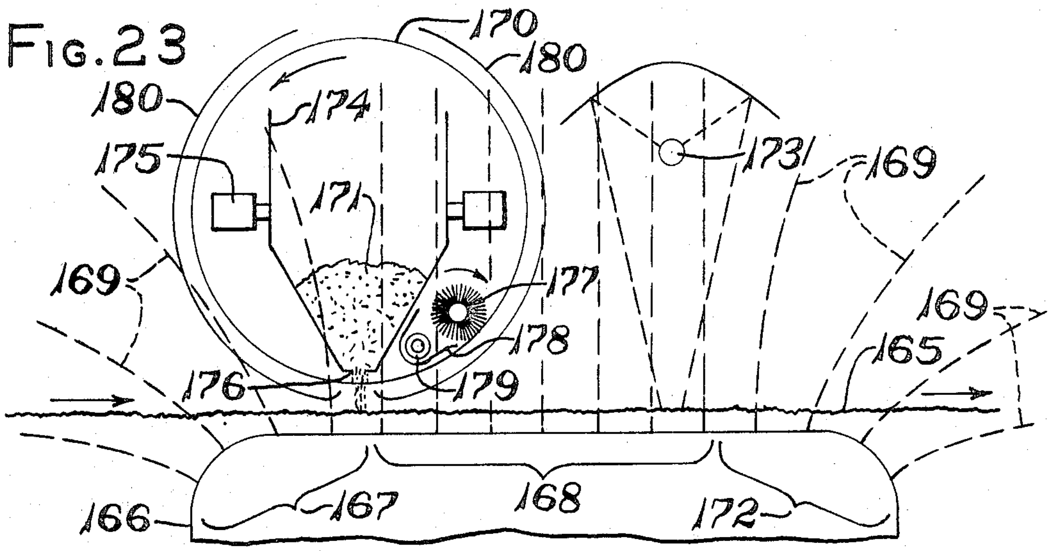
FIG. 23 is a schematic view of an apparatus for magnetic printing on irregular surfaces comprising a rotary stencil through which magnetic particles are selectively passed to deposit in a pattern on a substrate.

In FIG. 23 is shown an apparatus for printing on irregular surfaces, although it can be used for materials having regular surfaces, such as fiber board, glass, paper and the like and for controlling the motion of the magnetizable particles in a non-uniform magnetic field. In FIG. 23, paper 165 or corrugated board or other non-magnetic or non-magnetizable metal, organic or inorganic substance to be printed upon moves to the right as shown by the arrows. The end of a magnetic pole 166 is shown in partial view. The return magnetic path is not shown and a specific return path is generally unnecessary with air, or, if desired, a structural framework serving as the flux return path can be mounted above the apparatus shown. It is understood that a second pole of opposite character exists elsewhere on the magnet. The "polarity" (N or S) of the pole used for the process is not considered of consequence for proper operation. The magnet can be a permanent magnet or an electromagnet, but its pole as shown should be shaped to produce a relatively divergent magnetic field if moving outward from pole region 167 and a relatively uniform magnetic field if moving outward from pole region 168. Dotted lines 169 are used to represent magnetic field lines of force such as are being referred to. Thus, paper 165 is seen to move in a manner in which the divergent (or convergent if moving toward the pole) field area is entered first, followed by a more uniform field region.

A prepared stencil of the desired copy comprises all or a part of the surface of rotating stencil-drum 170. This drum rotates in the direction shown by the arrow and in synchronous speed relationship with material 165. The stencil may be prepared and constructed in one of several ways. One way is to use a fine-mesh wire screen which is coated with "photo-resist" type materials which can be exposed selectively to light from a master or original copy to produce the desired stencil or copy upon subsequent washing away of the undesired areas and fixing of the other areas. The stencil material can be composed of metal, nonmetal, organic, or inorganic substances, but it is preferred that magnetizable or highly magnetic materials not be used in the stencil member, to avoid disruption of the desired magnetic field configuration.

With the drum 170. a stationary reservoir of magnetic particles 171 is located. These particles are released from the reservoir in a controllable manner so that they can be attracted by the magnetic pole 166 and will travel downward toward it as shown. In this travel, the particles strike the inside surface of stencil-drum 170. In locations at which the stencil is not open, the particles are blocked and remain in the drum for re-use after being suitably collected. In locations at which the stencil is open, however, the particles continue on a trajectory parallel to or essentially parallel to the converging magnetic field lines. Those particles emerging in this manner from the drum strike against the upper surface of material 165 and do so in a pattern corresponding to the open areas of the stencil. It is to be noted that the magnetic field at this region is convergent toward the magnetic pole 166. Therefore, the particles striking material 165 will continue to experience a downard attraction. The magnetic field configuration provided with its associated attractive forces holds these particles essentially in place against the surface of material 165. The field configuration at this point has little, if any, convergent characteristic in any other direction. Thus, the particles will adhere to the surface of material 165 and assume the motion characteristics of it. In this manner, material 165 will receive a pattern of particles deposited in sequential fashion as drum 170 rotates, and the pattern will correspond with the pattern on the stencil. As material 165 moves to the right, it will carry the printed pattern with it into the region of more uniform magnetic field 168. The magnetic field at region 168 also should desirably be slightly convergent downward toward the pole.

Prior to the arrival of the dry magnetic pattern at the region 172 of the magnetic pole, the pattern should be subjected to a fixing step. This step can be carried out by one or more of the various methods mentioned herein. One method is to prepare the particles with a wax, resinous or thermoplastic coating or constituent so that radiant heating can be used to fuse or set the pattern to the material being printed. Radiant heat source 173 is shown for such purpose. Alternatively, paper 165 can have a top coating of a heat fusible or settable wax, resin or thermoplastic coating. The fixed pattern emerging from treatment by radiant source 173 is permanent in character, and thus is not disturbed as material 165 passes into field areas such as area 172 in which the direction and degree of attractive forces possibly could dislodge an unfixed dry pattern from the material 165 or a magnetic pattern which had not been driven into paper 165. A cold air source after heater 173 can serve to cool the surface and set the resin.

Figure 24:
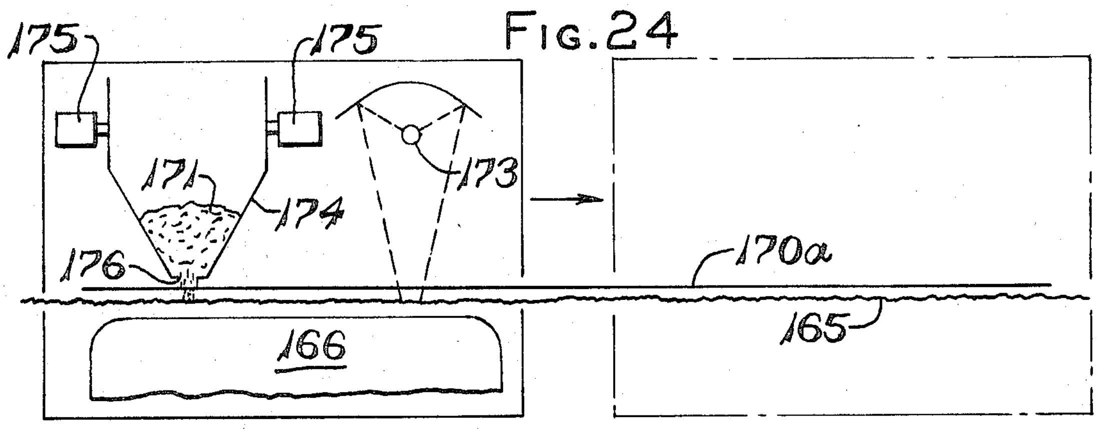
FIG. 24 is a schematic view partly in cross section of an arrangement of apparatus for magnetic printing similar to FIG. 23 in which the screen is flat and the magnet and particle holder scan the screen.

The arrangement of FIG. 23 can include processes for sequential printing of successive sheets of paper or other objects. Moreover, the apparatus shown can be operated in ther ways. For example, as shown in FIG. 24, the material (sheet or web) 165 can be stationary, a flat screen or plate *179a* also stationary could be made from, or used in place of, drum 170, and the magnet pole 166, reservoir 174, and radiant source 173 could move in a scanning manner across material 165 to accomplish the same result.

Magnetizable or magnetic particles in a magnetic field tend to cling to one another, and the pile of particles 171 in contact with one another may tend to remain as a mass and oppose separation of individual particles such as for use in the process described. Accordingly, it may be necessary to shake or vibrate the reservoir holder 174 to separate the particles by means of vibrators 175 attached to the reservoir holder. Alternatively, the particles can be suspended in a cloud and injected, (by a gas under pressure, etc.) in time pulse fashion or in synchronization with the movement of the drum and paper, through longitudinal opening or slit 176 in reservoir holder 174. In this case an oscillating or rotary shutter or other particle dispensing device as discussed hereinbefore can be mounted in or above the slit to control the ejection of the particles through the screen. However, holder 174 with the lower opening is still desirable as it serves as a baffle to feed the particles into the most desirable region of the magnetic field, To remove magnetic particles falling on the inside of the screen of drum 170 in the blocked areas or which may not all fall through the open areas rotary brush 177 is positioned adjacent the screen to remove such particles and deposit them in trough 178 where they are removed to the outside of the drum or to storage for reuse by screw conveyor 179. This avoids the chance that some particles may cascade down the inside of the drum 170 and out through the open areas of the screen removed from the line of printing to cause background problems or interference with the printed copy. Alternatively, or in addition to the use of the brush, trough and conveyor, generally curved baffles 180 can be placed around drum 170 to collect displaced particles which may come through the screen to cause background problems etc. The baffles can be cleaned continuously or periodically as desired. Wipers or conveyors can be installed in the baffles to mechanically clean them. The brush, trough, conveyor and baffles etc. should be made of nonmagnetic or nonmagnetizable metallic, wood or plastic or other structural materials.

Figures 25, 26, 27:
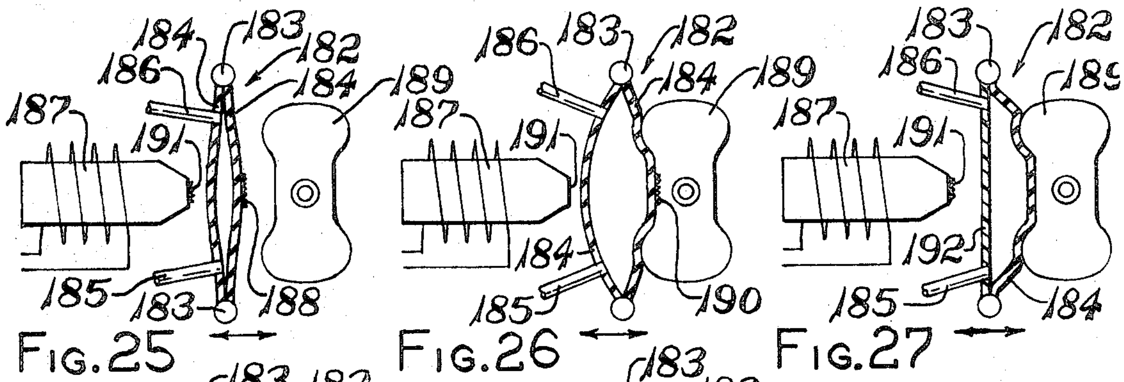
FIG. 25 is a schematic view partly in cross section of an arrangement of apparatus for magnetic printing using a flexible and expansible carrier for the magnetic particle pattern.
FIG. 26 is a view similar to FIG. 25 showing application of the flexible carrier to an object having an irregular surface.
FIG. 27 is a view similar to FIG. 26 in which the carrier has a rigid or semirigid backing member.

In FIGS. 25 to 29, which are schematic, there are shown further embodiments of the present invention. The method and apparatus shown in these figures may be used in conjunction with the apparatus and methods previously discussed especially with regard to FIGS. 14–20, above. As shown in FIGS. 25 and 26, carrier 182 containing supporting members 183 comprises a flexible or elastomeric rubber or plastic bag or envelope (natural, SBR, nitrile or neoprene rubber, or plasticized PVC) or other appropriate flexible material attached to supporting members 183. The walls 184 of the carrier can be fabric reinforced rubber for strength, and where the carrier is to be operated at elevated temperatures, the rubber may be a heat resistant silicone, acrylate or fluorocarbon (Kel–F) rubber. Inlet and outlet tubes or pipes, 185 and 186, respectively, are positioned in the rear wall of the carrier to provide means for pumping in and pumping out gas or liquid (air, $N_2$, water, etc.). Tubes 185 and 186 are connected to suitable supply containers, pumps, and valves for controlling the proper pressure, heat, and amount of air, etc. supplied. It will be appreciated that if expansion and contraction only is desired, only one conduit or tube may be needed since after expansion, the pressure on the carrier can be released to atmospheric and walls 184 will return to their normal position as shown in FIG. 25. With type bar or field source 187 energized and the pattern 188 of magnetic particles on the surface of the carrier, the carrier 182 is moved to the object or product 189, or vice versa, the carrier being expanded by water or air forced through tube 185 before it contacts the face of object 189. The expanded carrier thus forces the pattern against and prints on the irregular surface of the object which may be a perfume, detergent, beverage bottle or other container having an uneven or irregular surface. Just before or after printing, the field source 187 is deenergized. After printing, the air pressure on the carrier is released, the carrier contracts, and the carrier 182 and object 189 are separated to begin the cycle of printing anew. Where the object 189 is thermoplastic or has a thermoplastic surface, or where a thermoplastic sheet lies on the surface of the carrier onto which the magnetic particles are deposited in a pattern, the carrier can be heated by means of hot air or water or other fluids or by a hot roller to cause the thermoplastic to soften and hold the magnetized particle pattern. Following heating and printing, the hot water can be replaced with cold water or other coolants to cool the carrier before the next cycle of printing. On the other hand where a thermoplastic sheet is not used on the carrier, or even where the magnetic particles are not mixed with thermoplastic particles, etc., the carrier can remain in a heated condition. The surface of the carrier, also, as pointed out herein, can be treated with a silicone release agent or with Teflon to prevent sticking to the bottle. Since during expansion of carrier 182 against object 189, the printing surface 190 of the carrier may tend to change dimensionally, appropriate changes can be built into the indicia 191 on the surface of field source 187 to compensate for any such change or possible distortion which might occur in operation. In fact, the method shown provides a way to expand the magnetic particle pattern so that it is larger than the indicia 191 on the pole of field source 187.

FIG. 27 represents a modification of the device shown in FIGS. 25–26 where the rear surface 192 of the carrier is rigid or semirigid and comprises a sheet of stainless steel, acrylonitrile-butadiene-styrene copolymer, etc. or other suitable nonmagnetic or nonmagnetizable material. In this case the expansion only occurs on the flexible side of the carrier and thus conserves space.

Figures 28, 29:
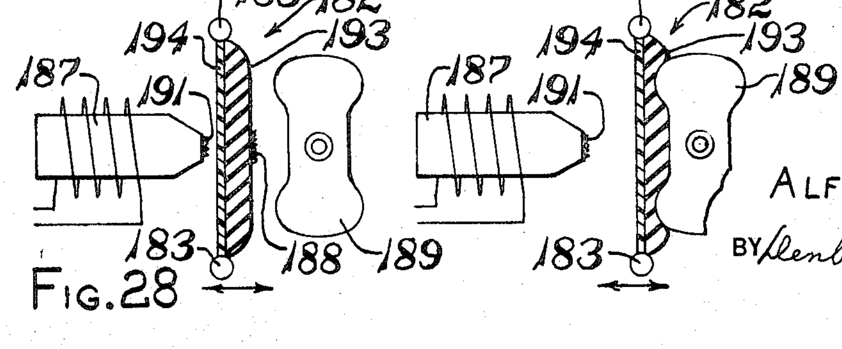
FIG. 28 is a schematic view partly in cross-section of another carrier for magnetic printing and involving the use of an elastomeric of flexible material having a rigid or semirigid backing member.
FIG. 29 is a view similar to FIG. 28 showing the application of the carrier to an object having an irregular surface.

In FIGS. 28 and 29 a further modification or embodiment of the present invention is shown in which a carrier 182, which is somewhat wider than the object 189, is used in order to partially encompass the object and provide for adequate pressure along the area to be printed. In this device the printing or carrying member 193 of the carrier comprises a flexible preferably elastomeric, foam 193 such as natural or butadiene-styrene copolymer rubber, nitrile rubber, neoprene rubber, plasticized polyvinyl chloride, polyether and/or ester-urethane, etc. Other flexible preferably elastomeric rubbers and resins can be used. While the foam may be open or closed cell, the surface adjacent the object 189 should be closed cell or should have a skin or coating which is abrasion resistant and which carries the pattern of magnetized particles. The surface or skin coating on the foam should be a flexible and/or elastomeric material of the same type as the foam, but it may be a different material in which case adhesives or cements may be necessary to secure the skin to the foam. In the case of the polyurethanes a Hypalon (chlorosulfonated polyethylene) coating may be sprayed onto the surface of the foam prior to use. Still other flexible and/or elastomeric foams and coatings for the same may be used. The working surface of element 193 may also be treated with release materials as discussed above. Also, foam element 193 contains a rigid or semirigid backing member 194 which supports the foam and helps in applying pressure against the surface of bottle 189 to be printed. It can be any of the rigid and semirigid materials discussed supra which are nonmagnetic or nonmagnetizable. It will be appreciated that the flexible magnetic particle pattern carrying means of carrier 182 of FIGS. 25–29 should be sufficiently strong to withstand the use to which they are put but nevertheless should not be too thick in unexpanded or expanded form to excessively take up too much space in the air gap or in effect to move the pattern into other magnetic lines of force to alter the pattern in which case further modification of indicia 191 on field source 187 will be required.

Referring first to FIGS. 1, 4 and 9–13 and the accompanying description above, a process is shown by which a permanent mark is made on a piece of paper, for example, instantly in a dry process without heat. Field sources or type-face units 44 of FIGS. 9–13 can be replaced by a plurality of pointed probes the magnetization of which can be individually controlled electrically at will, so as to copy a given original pattern. The basic arrangement of the equipment for such process consists of the elements illustrated in FIG. 30, in which an original presentation of information consisting in this case of a letter W written on the underside, as shown, of a piece of paper 201, as shown, is arranged so that a linear array 202 of photoelectrically sensitive cells 203 will respond to the information along an optically observed line 204 on sheet 201 in the field of view of lens 205. The photocells are located in the focal plane of lens 205. Thus, at any time when suitable illumination is present as known in the art, the photocells 203 are excited in a pattern corresponding to the light and dark characteristics of original copy 201 along a typical line 204. The definition and resolution of this excitation can be improved when closely-spaced photocells are used. Upon moving the array 202 and lens 205, as shown by the arrows, the optically observed line 204 scans from one end to the other of the sheet 201, and a complete time-dependent characterization of the information on sheet 201 is available via the outputs of photocell array 202. A complete mosaic of photocells can be used instead of line-wise scanning although such may be more complex than the line-wise method. Also, the line arrangement permits staggering of photocells to achieve better resolution as will be described later.

The outputs of all photocells 203 of cell array 202 are continuonusly fed through amplifier system 206 in an individual manner to provide corresponding energizations of the individual electromagnetic writing tips 210 located at the reproducing region of the apparatus. Said tips are arranged in a line array 211 corresponding to the original photocell array so that when a given individual photocell 203 is optically excited, an individual magnetic tip 210 corresponding in spatial relationship, is caused to be energized at a corresponding position on sheet 212 upon which the reproduced copy is to be created. Sheet 212 can be held in place near its corners or in a suitable frame. By means of the basic procedures and principles described herein by causing magnetic array 211 to scan in synchronism with photocell array 202, sheet 212 is caused to receive typically from a cloud 215 of magnetic or magnetizable particles, above sheet 212, a directly printed portrayal of the original. To accomplish said reproduction, amplifier unit 206 may also, desirably, besides providing suitable power amplification of the original information, produce oscillatory or alternating energization of magnetic elements 210 in keeping with the advantages described for the procedures of FIGS. 1, 4 and 9–13. It is to be understood that a source of light is positioned near or adjacent sheet 201 so that light patterns (direct or reflected) are passed through lens 205 in accordance with the pattern on sheet 201 to the photocells. Suitable shielding means can be employed to be certain that only the desired light rays from sheet 201 are being used and to avoid extraneous light rays. The light source for activation of the photo sensitive devices can be any form of radiant energy such as sunlight, tungsten bulb, fluorescent, infrared, ultraviolet, etc.

Figure 30:
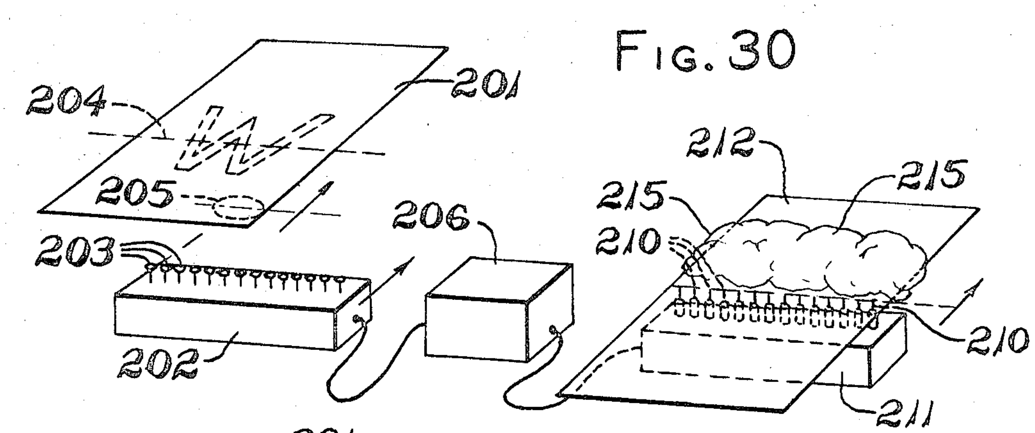
FIG. 30 is a schematic diagram in perspective of an arrangement of apparatus in which an array of photocells scans the copy and transmits impulses to an array of magnets which reproduces the copy using magnetic powder.

Several alternative arrangements of the photocell array and the magnetizing array of FIG. 30 can be obtained by use of flexible interconnecting wiring between the two. These arrangements permit the photocell array to scan vertically while the magnetic array scans horizontally, and vice versa. The cloud of magnetic particles can be located below sheet 212 and sprayed upward onto it in the reverse manner of arrangement to that shown in FIG. 30, for example, with magnetic array 211 positioned above sheet 212. Also, the scanning of either unit need not take place in a straight path but can be curved as on a drum, fan-shaped, or can take other desired paths, and the component photocells or magnetizing tips of the arrays need not be mounted in a straight line. A mosaic of magnetic writing tips can be used.

The apparatus of FIG. 30 as well as that described herein shows that dot-wise, lined or continuous patterns can be magnetically reproduced on a member to be printed. However, the method shown does not need a recording member, it includes all the necessary steps to produce a general copy of an arbitrary original, and it permits this to be done without special paper or heat when desired.

Figures 31, 32:
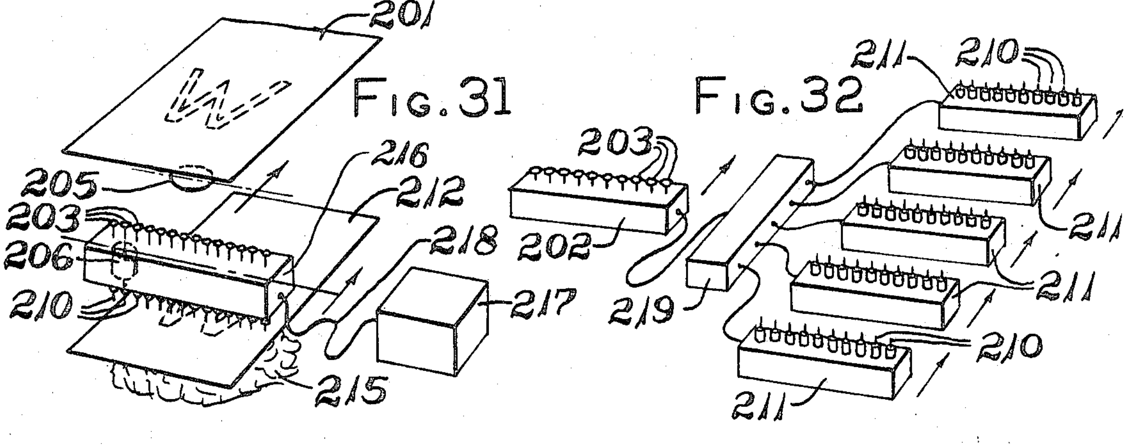
FIG. 31 is a view similar to FIG. 30 in which the photocell copy array is mounted adjacent the magnetic-core reproducing array in the same apparatus.
FIG. 32 is a perspective schematic view of the use of one photocell scanning array to activate a plurality of magnetic-core scanning arrays to reproduce a number of copies.

FIG. 31 shows that the amount of flexible wiring could be reduced and a saving of space realized by mounting both the photocell and magnetiziing arrays on the same scanning carriage. The amplifiers can also be contained in the scanning carriage with only power-supply connections of minor complexity connecting to other facilities. As shown in FIG. 31, paper 201 is being scanned by motion of scanning carriage 216 and lens 205 in the direction shown by the arrows. The scanning carriage has integrally mounted to it or within it the photocells 203 in an array, the amplifiers 206 and the magnetizing elements 210 in an array. Electric power in suitable form is connected to the scanning carriage from power supply 21 by means of flexible leads 218 in the figure shown. Other possible means for transmission of such power include slip-ring tracks or wheel electrodes, etc. or batteries can be used on the carriage in a portable-type design. Cloud or other particle supply 215 in this case is beneath the sheet 212 upon which the reproduction is being made. Sheet 212 can be supported in position by suitable mechanical holders at its corners or in a frame.

It is to be noted that in both the schemes of FIGS. 30 and 31 that the reproduced copy is imprinted in final form simultaneously as the original is scanned in a one-step process with no relay for receipt of copies after exposure. In some cases, more desirable results may be obtained when prior or subsequent steps are included into these processes. Such combinations that can separate some of the single or combination steps or apparatus of this invention into separate steps, or parts thereof, are considered to be implied in the present disclosure.

It can be seen that in FIG. 30, the information to permit the operation of magnetizing array 211 is conveyed to that array and carriage via flexible wiring so as to make the location and scanning direction of array 211 generally optional. Two individual and identical electromagnets such as magnetizing units 210 can be energized in parallel connection by one energy source by providing to such a parallel connection twice the current required for one unit. Also, two identical units can be operated in series connection by supplying twice the voltage. Thus, referring to FIG. 32, a larger amplifier 219 can be used to supply magnetization to several synchronized magnetizing arrays 211 simultaneously to reproduce several copies simultaneously from one original being scanned by a photocell array 202, when it is desired to reproduce several copies at once such as publishing. Alternatively, because of spatial and cost considerations, etc., it may be desirable to employ a separate amplifier for each magnetizing array 211 and to obtain the multiple signals at an earlier point in the circuit from a preamplifier at the output of photocell array 202.

Figure 33:
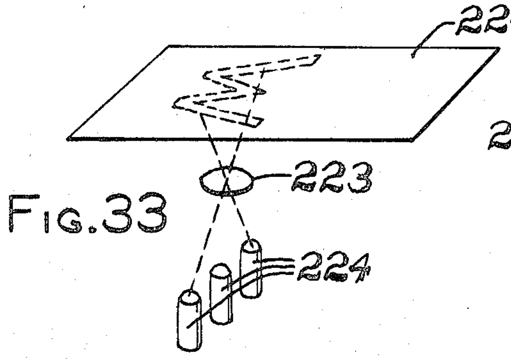
FIG. 33 is a perspective schematic view of a staggered arrangement of photocells used in conjunction with a single lens.
Figure 34:
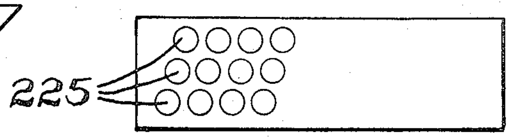
FIG. 34 is a vertical view of the device of FIG. 33 showing the staggered arrangement of the active areas.

In order to improve the resolution or definition (see FIGS. 30–32) of the reproduction action, individual photocells and magnetizing tips may desirably be arranged at very short intervals, or larger photo-sensitive devices can be used with the effect of closer spacing by optical arrangements as shown in the copending application of William C. Heller, Jr., entitled "Method and Apparatus for Color Printing and the Like," Ser. No. 506,991. In accord with the above-identified copending application, the optical paths of view of FIG. 33 are complemented by those available with additional photocells, staggered with relation to the cells shown in FIG. 33, so as to provide the cell array of the plan view of FIG. 34.

Figure 35:
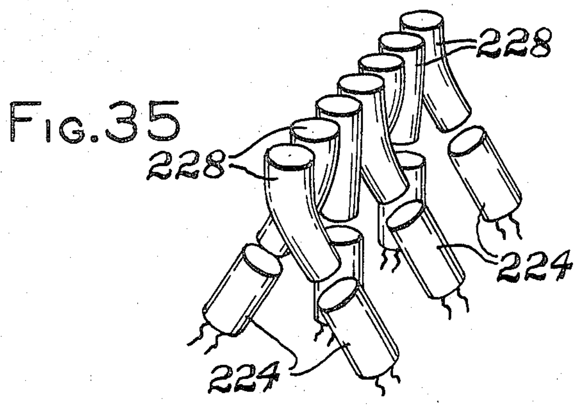
FIG. 35 is a perspective schematic view of an arrangement of a row or array of photocells to obtain more complete coverage of a given area and/or closer spacing between cells.

In FIG. 35, an arrangement employing "fiber-optics" is used in which individual small-diameter optical fibers 228 of glass or plastic are arranged so that every third fiber points to a photocell in a given row. The photocells 224 may thus occupy more space while sensitive to a smaller area than otherwise possible. In place of the specific arrangement described, other combinations can be used such as alternate fibers, every fourth fiber, etc.

Figure 36:
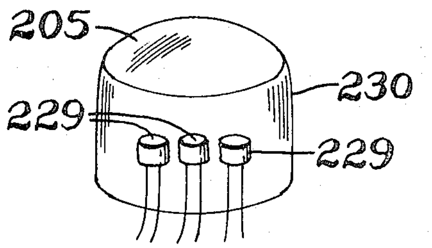
FIG. 36 is a perspective schematic view of an encapsulated array of photo-sensitive elements incorporating a lens.

Still other photo-sensitive devices may be used to scan the master, original or copy to be reproduced. Photosensitive devices of one or more rows using micro-circuits can be employed. For example, one type of photo-sensitive device that can be used comprises a silicon-integrated-circuit in which a given wafer of silicon or germanium is prepared by selectvely doping individual areas to provde multiple electronic components on one piece of material which is also outfitted with separate electrical connections to each member component. Another photosensitive device can be used and is made by mounting or depositing of small wafers of cadmium sulfide, zinc sulfide, or Cs, Ba, Sr, Rb, or alloys, mixtures, and compounds thereof with Ag and/or oxygen on a given single piece of material such as glass, mica, plastic etc. outfitted with leads. A device called a "Scanistor" and disclosed in "Computer Design," Experimental Solid-State Scanning Device, May 1965, pages 46–50, can also be used. Thus, there can be used a scanner containing a plurality of small photosensitive areas closely spaced apart by only a few mils or less and having individual leads connected to each photosensitive area. A number of such integrated-circuit units are then mounted in a linear array as desired as shown in FIGS. 30–32 and 35. The array is then potted or encapsulated in plastic, if desired, so that the active surfaces of the photosensitive areas are covered by a clear material (glass or plastic) contoured to produce lens action to eliminate the separate lens 205 of FIG. 30. In FIG. 36 is shown a device of this type in which a plurality of small photosensitive units 229 are mounted adjacent lens 205 and encapsulated in plastic material 230. The unit shown can be connected to amplifier 206, can be combined with an amplifier and magnetizing array, or used to supply several magnetizing arrays as shown in FIGS. 30–32.

Figures 37, 38, 39, 40, 41, 42:
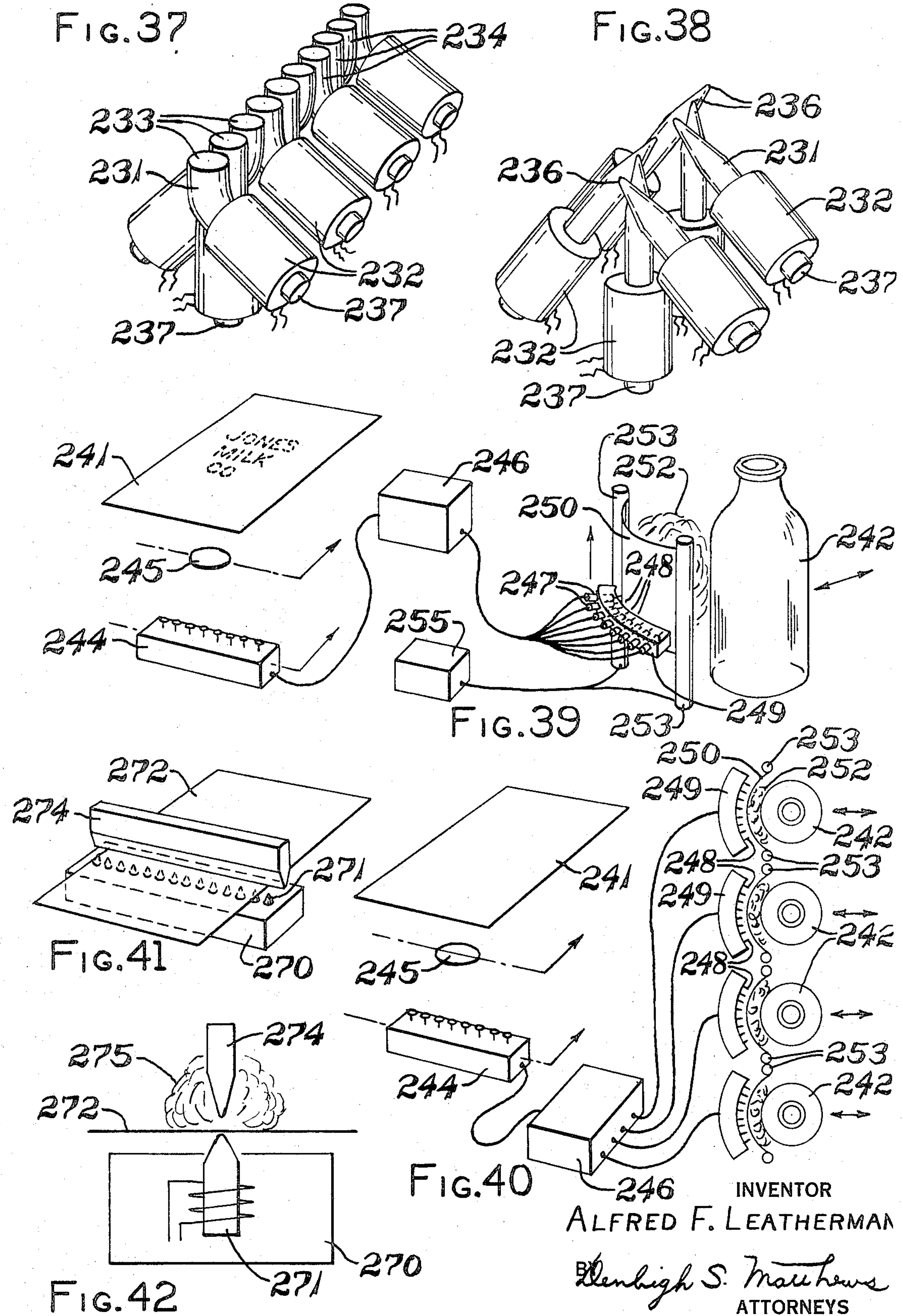
FIG. 37 is a perspective schematic view of a row or an array of magnets (cores and coils) for obtaining closer spacing between cores.
FIG. 38 is a view similar to FIG. 37 in which the cores of the magnets have relatively sharp points to increase definition and obtain closer spacings.
FIG. 39 is a perspective schematic view of an arrangement of apparatus utilizing photo-sensitive devices for reading material to be reproduced and a plurality of magnetic cores for scanning a carrier to collect a magnetic pattern for deposition of the pattern on an object such as a bottle.
FIG. 40 is a partly perspective and partly top plan schematic view of an arrangement of apparatus similar to FIG. 39 but in which a plurality of objects such as bottles are magnetically printed at one time from a single original.
FIG. 41 is a perspective schematic view of a portion of the apparatus of FIG. 30 showing the use of a pointed elongated bar above the array of magnetic cores to concentrate the magnetic lines of ffux.
FIG. 42 is a vertical elevational schematic view of the arrangement of apparatus of FIG. 41.

In order to provide close spacing in the magnetizing array, an arrangement similar to that of FIG. 35 can be made in which individual ferromagnetic cores are bent in a staggered manner as illustrated in FIG. 37. Individual cores 231 are arranged with every third core similar so that coils 232 for every third core are in a common row. Upon energizing coil 232, magnetic flux is established in its core. The upper ends of these cores are located as closely as possible to, or in contact with, the paper or other material upon which the reproduction is being made. When the flux of a given core tends to spread or transfer to its neighbor and tends to decrease the sharpness of the spot created by the magnetic powder attracted from the cloud by core 231, the active ends 233 of cores 231 may be made in a different shape and/or the lengths 234 of the parallel portions of the cores may be changed to reduce this effect. Generally, coils 232 should be located as close as possible to the active ends 233 of the cores 231 and the parallel sections 234 should be short.

FIG. 38 shows another magnetizing array where the magnetizing units have sharply pointed active ends 236 on the cores 231 and the parallel sections have been eliminated to increase the resolution and reduce the tendency of the flux to shift to adjacent cores. If desired, the cores shown herein, especially in FIGS. 37–38, may have their rear extensions connected to a common magnetic member or a magnetic or magnetizable piece or washer may be connected to these extensions to provide a better return path for the magnetic flux. The apparatus of FIGS. 33–38 are related in the method of this invention.

The elements of the apparatus of FIGS. 30–32 are constructed to show the process as applied to a system in which the magnetized or magnetizing units 210 are located on one side of sheet 212 while the cloud of particles 215 is on the other side. Applications exist in which it will not usually be possible to achieve access to both sides of the substance upon which the imprintation is to be made. To achieve printing from one side of an object such as a package in which the narrow neck prohibits access to the interior, use can be made of portions of the apparatus of FIGS. 14–20 above. For example, type-face or field source unit 94 in FIG. 19 is replaced by a magnetizing scanning array such as 211 of FIG. 30. A carrier member similar to carrier 96 of FIG. 19 would be substituted for sheet 212 of FIG. 30 and a pattern would be created on it by scanning of the magnetizing array. The carrier then serves to transfer the pattern to the product upon which a permanent mark is made. The transfer can be aided in a variety of ways such as discussed above, including the use of a pre-applied adhesive on the product, a clear film with adhesive located on the carrier prior to making a pattern, a dry pattern (pattern of magnetic particles free of resin) with induction heating of the carrier by means of a coil, a hot-melt pattern (a pattern formed of the magnetized particles mixed with heat softenable resin, thermoplastic etc.) that would be softened by the heated carrier, or a resistance-heated carrier with dry or hot-melt patterns thereon. Although possible, it is not desirable usually to attempt to use hot cores in the magnetizing array or to use the cores to produce induction heating of the carrier due to power consumption and the need for extra cooling equipment. An arrangement of equipment in which a resistance-heated carrier is used is shown in FIG. 39. Original format 241 contains the pattern to be reproduced on plastic milk container 242, for example. The pattern is located on the rear of original sheet 241 so as to be in the optical field of photocell scanning array 244 and lens 245 which scan as shown by the arrows. The original 241 may consist of any simple material such as a piece of paper upon which, for example, a pattern of india ink has been prepared. The sheet need not be flat as shown but can have other shapes such as cylindrical if desired, so long as the lens and photocell scanning equipment are rearranged correspondingly to maintain good optical focus and permit scanning. It should be clear here as well as in apparatus previously described that the photocells 244 or other photosensitive means employed may have to be shielded or protected from extraneous light so that they pick up only the desired light rays reflected or transmitted from the image on paper or other original being copied, and a reflecting and/or focussing mirror may be used instead of lenses.

The output signals from the photocell scanning array are amplified by amplifier equipment 246 and used to energize individual magnetizing coils 247 and tips 248 in the magnetizing array 249 which scans simultaneously and in synchronism with the photocell array. The magnetizing tips of array 249 are located close to or in contact with the rear surface of carrier 250 which is made of a thin sheet of stainless steel or other suitable nonmagnetic electrical conductor. Since the carrier 250 is nonmagnetic, the selective pattern in which the tips are magnetized and deenergized acts to attract magnetic particles from particle cloud 252 to form a pattern of particles on the front surface of carrier 250. The particles need not be provided in the form of a cloud but can be a shower, cascade, spray, etc. Upon completion of scanning by magnetizing array 249, the complete magnetic particle pattern has been formed on carrier 250. After this time, at this time, or prior to this time if preferable, carrier 250 is heated by means of self-resistance upon energizing it via current-carrying supports 253 by means of power equipment represented by transformer 255. The proper use of heat may help to hold the particle pattern in place on the carrier. The carrier is moved mechanically to cause it to press the pattern of magnetic particles against the surface of product 242, for example, a polyethylene milk container. Upon continuation, if necessary, of the heating action of carrier 250, the dry pattern of magnetic particles becomes imbedded in the surface of product 242 as the heat of the carrier causes said surface to soften, become partly fused, and capable of flowing so as to achieve bonding with the particles. As discussed previously, a release agent such as Teflon or silicone coating can be used on carrier 250. Also, the carrier can be cooled at this point, if desirable, to assist solidification of the bonded pattern by means of air blasts etc. The carrier then returns to its original position, the face of the carrier cleaned if necessary, and the scanning step is repeated in preparation to printing on another product item.

In FIG. 40, the basic components of a multiple-station arrangement are shown taking into consideration FIGS. 30–32 and 39 and the disclosure relative thereto. The multiple equipment units that create the patterns on product 242 are shown in a top view. The equipment operates to produce several reproductions simultaneously from a single original.

In the examples shown in FIGS. 30 and 40 for the magnetic reproducing method, it is evident that a single copy is being reproduced many times over in identical fashion on a succession of products such as milk containers. Inasmuch as the electrical signals transmitted from photocell array 244 to amplifier 246 of FIG. 39, for example (see also FIGS. 30–38 and the discussion relative thereto), are electrical in nature, these can be replaced by the output of certain electronic memory equipment such as a multiple-track tape recorder, with multiple outputs corresponding to each photocell signal. It is seen that a single recording can be used if composite scanning is employed as in television. A recording or memory system with sufficient multiple outputs may be used.

The apparatus of the present invention for making graphic representations by means of magnetic particles can alternatively have supplied to it meaningful electrical signals of other types besides those available from magnetic tapes and the like. For example, in the art of ultrasonic inspection, it is often desirable to employ a map or image type of output presentation. In this system, special devices create patterns on recording paper in a manner correlated with the ultrasonic inspecting signals developed during scanning of an object being inspected, and thus a map is prepared of the defects in the object. The magnetic marking equipment of the present invention could serve in the production of such maps in response to electrical signals from ultrasonic inspection equipment, and related applications of this sort will be evident to those skilled in the art.

It is known in the art of electronics that an electronic signal representing video information can be processed by appropriate circuitry to cause a greater or lesser contrast or resolution in the resultant portrayal. Hence, the circuitry of the "amplifier" described is not restricted to simple amplification but can incorporate contrast and resolution modification, for example, and other known operations. As another example, by suitable readjustment of the scanning speeds and amounts of travel, the equipment shown herein can be arranged to produce either a magnification or a reduction in the size of the pattern formed on the product with respect to the original. Also, an electronic synchronizing signal can be combined into the equipment to aid in governing sychronism in the scanning action of the photocell and magnetizing arrays.

Also, to further reduce any fringing that may occur and to obtain sharper magnetic printing or imprinting reference is made to FIGS. 41 and 42. Fringing is the tendency for magnetic flux lines to diverge upon emanating from a point-like source.

In the embodiments of this invention discussed in connection with FIGS. 30–32, a pointed body could be used as shown in FIG. 41. In FIG. 41, the array 270 of magnetizing elements 271 is shown located beneath paper 272 or other object to be printed upon. Above paper 272, a pointed body 274 or knife edge of soft iron or other magnetizable material is shown which is intended to scan in synchronism with the magnetizing array. The knife edge 274, element 271 and paper 272 are shown in cross section in FIG. 42. The individual elements of the magnetizing array are shown with pointed ends, but when small diameters are used for their cores, the pointed end can be dispensed with, with little or no change in performance. In FIG. 42 a cloud 275 of magnetic particles from a suitable source is also shown to illustrate that the knife-edge body 274 does not preclude access of this cloud to the region in which the pattern is being formed on the paper. The apparatus in FIGS. 41 and 42 shows that if the second body 274 is shaped in a more pointed manner, improved results are obtained as evidenced in two aspects. First, the directions in which the lines emerge from the point will be less to the side on average, and more nearly of the "straight" type. This provides improved pattern definition. Second, the pointed nature of the second body produces a more highly concentrated magnetic field intensity at and near the point of the element. In the applications of magnetic printing discussed herein, the concentrating effect permits reduced magnetizing currents in the windings and resultant economies in number of turns and driving power requirements. Further, the closer to one another the facing points can be operated, the greater the expected improvement of results.

Instead of a single pointed member 274, as shown, a plurality of pointed magnetizable bodies disposed opposite the magnetic cores can be used; these bodies can be separated or joined to a common magnetic bar or other means.

Figures 43, 44, 45:
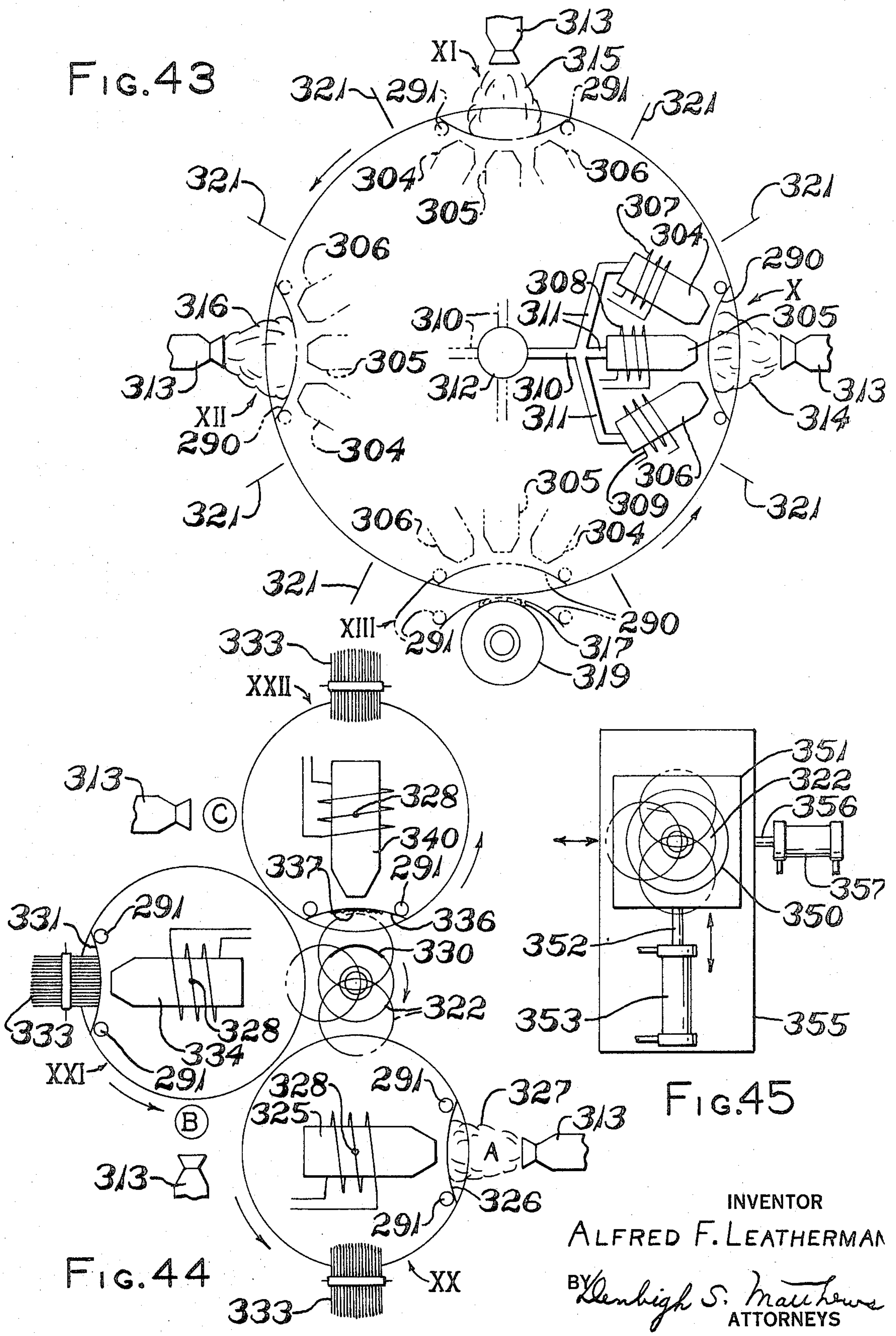
FIG. 43 is a top plan schematic arrangement of apparatus for developing several different colors on a carrier and then applying the composite magnetic color to an object such as a bottle.
FIG. 44 is a top plan schematic view of an arrangement of apparatus for magnetic color printing on an object where the object is printed with different magnetic colors in three different steps.
FIG. 45 is a top plan schematic view of an arrangement of apparatus for moving the object to be printed in FIG. 44.

In FIG. 43 a rotary arrangement is shown in which the three positions shown by numbers X, XI and XII permit three different colors to be collected in sequence by carrier 290 which can include supports 291 which can be current carrying. Three segments 304, 305 and 306 of the general type-face unit or field source having indicia, design, pattern and the like on their operating ends are outfitted with separate magnetizing coils 307, 308 and 309 to permit individual magnetization and are connected by bar 310 and arms 311 to rotary shaft 312. Supply hopper 313 or other source of magnetizable cloud or particles delivers cloud 314 adjacent the type face. Type-face segment 304 is energized to form the pattern of color from a mixture 314 of magnetizable particles and pigment particles (preferably pigmented magnetizable particles or a composition of a resin or plastic containing pigment and magnetizable particles) at station X and then de-energized. Natural adhesion forces or a weak D-C current may then hold the particles in place without collecting additional particles in subsequent steps, or a hot carrier may hold the particles of the hot melt variety in place. Similarly, segments 305 and 306 then form color patterns from color mixtures 315 and 316 at stations XI and XII. The combined color copy 317 is then applied to product 319, such as a bottle, at the last station (number XIII). Baffles 321 serve to maintain separation between the individual clouds of colored particles.

Other equipment arrangements are possible in which rotation or step-wise movement of the package as well as step-wise movement of the printing mechanisms permit multicolor copy to be made. As shown in FIG. 44, package or bottle 322 to be printed is centrally located and is printed in three positions marked by numbers XX, XXI and XXII. In the position shown by numeral XX, the type-face or field source 325 is energized and carrier 326 collects magnetizable particles from cloud 327 of Color A from supply hopper 313 preparatory to printing on the next package, not shown. The type-face and carrier units are arranged to pivot as a body around pivots 328. The darkened area 330 of package 322 was printed by carrier 326 two steps prior to that shown. The package has since been rotated through two 90-degree clockwise steps.

Carrier 331 is shown being cleaned by rotary brush 333 as an example, or other cleaning methods can be used. This carrier has just completed printing Color B (in the general area shown by circled B) onto package 322 in area 330 and has since been pivoted to the position shown with its field source 334. Package 332 has since been pivoted 90 degrees to the position shown in the figure.

Carrier 336 is shown ready to imprint pattern 337 of color C onto darkened area 330 of package 322 formed by field source 340. Following the application of color C, in the general area defined by the circled C in the figure, package 322 will be removed from the equipment and a new package placed into position for imprinting. At that time, carrier 326 will be ready to pivot into position for imprinting color A onto the package. Carrier 326 will then pivot 180 degrees and be cleaned by its rotary brush 333 or other cleaning apparatus, etc.

The arrangement just described avoids the possibility of attraction of differently colored particles to a carrier since a given carrier is used for only one color. Natural adhesion forces, or a D-C magnetic holding field can be used to hold collected patterns in place until imprinting occurs, as has been described earlier.

In place of rotary brush 333, the carrier may be cleaned by means of a belt, air stream, wiper or solvent or by means of vibrators or magnets. The type-face 328 etc. may also be cleaned by the various means disclosed if it is desired.

As shown in FIG. 45 taken in conjunction with FIG. 44 package or bottle 322 is positioned on turntable 350. Slide 351 actuated by piston 352 connected to fluid operated cylinder 353 serves to move the paikage and turntable to and from positions XXII and XX so that the carriers when in place in these positions will imprint the magnetic particle pattern on the surface of the package. In turn slide 355 is moved by piston 356 connected to fluid cylinder 357 which when actuated moves the slide and package into operating position XXI to be imprinted by carrier 331. It is apparent that slide 351 must move approximately twice the distance of slide 355. After each printing step is completed the appropriate slide is retracted and the turntable is rotated to a new position.

In FIGS. 43–45, as well as in other embodiments previously shown herein, for certain purposes, the carrier may be eliminated and the magnetic powder cloud caused to deposit directly on the indicia on the pole piece or core of type face 304, 305 etc. By mildly jarring or vibrating the type face, the excess magnetic powder can be removed. The type face and consequently, the powder, then can be heated by a superimposed high frequency induction current or by hot air etc. to a temperature sufficient to soften the outer layers of the plastic bottle and momentarily pressed against the bottle and removed to leave a magnetic print on the bottle, such as a polyethylene bottle, corresponding to the indicia on the type face. Only sufficient pressure should be used to press the magnetic particles into the softened plastic to cause adherence without spreading out or smearing the print and also to avoid appreciable distortion of the surface of the bottle.

Multicolor imprinting from one side also can be accomplished by moving the package, for example, through successive stations which apply the different desired colors, or more than one carrier might be used. In moving the package, stations such as shown in FIGS. 14 to 19 supra, are located at different portions of a package-conveying or handling system. The color components can then be applied in sequence. Over-printing or otherwise combining the successive colors can produce complementary colors from primary ones.

In other embodiments of this invention as shown herein, in which magnetized type-face units may be used, magnetic bodies nominally of corresponding facing areas could be used to concentrate and adjust the configuration of the magnetic fields.

The accumulation of excess magnetic particles (aggregation) on the carrier or object to be printed and/or dragging of particles from the desired area to be printed caused by movement of the paper or object of movement of the magnet still having some residual magnetic force can be reduced or eliminated by proper timing and current pulse control in energizing and de-energizing the magnetizing elements so as to remove magnetization prior to the possible collection of excess particles. Air jets or turbulent air currents directed near the pattern being formed can be used to dislodge the excess, more loosely held particles. Vibration can be used to dislodge excess particles such as can be achieved by sonic or mechanical vibration, or by ultrasonic waves. Vacuum action can also be used to remove excess magnetic particles. Build-up of particles in an electrostatic process does not occur to a great extent since the charged particles neutralize the electrostatic image as they collect on it. However, with magnetic particles a charge neutralization effect does not occur in this manner since each magnetizable particle in a magnetic field tends to become a magnet itself and to transmit flux to its neighbor. In this manner, printing of greater opacity may be realized by magnetic methods.

Magnetic materials for use in making the magnet or cores and the magnetizable or magnetic particles can be any magnetic material known to the art. Examples of some metals and alloys are iron, cobalt and nickel and their alloys such as a 35Co-65Fe alloy; silicon steel; low carbon (0.1–0.2%) cast steel; high carbon (above 3%) cast iron containing 3% Si and varying amounts of P, Mn and S; Ni and Fe alloys with small amounts of Mo and Cr; 50Ni-50Fe alloys which can contain a small amount of copper; 54.7Fe-45Ni-.3Mn; 17Fe-81Ni-2Mo; sintered $MnFe_2O_4+ZnFe_2O_4$; tungsten steel containing 5W, .3Mn and .7C; chromium steel contaiing 3.5Cr, .9C, and .3Mn; alloys of iron and various amounts of Al, Ni, Co and Cu etc. such as 12Al-20Ni-5Co, 10Al-17Ni-2.5Co-6Cu, 8Al-15Ni-24Co-3Cu-1Ti; alloys of iron, 52Co and 10–14V; an alloy of 50Cu, 21Ni and 29Co; an alloy of 86.8Ag, 8.8Mn and 4.4Al; an alloy of 77Pt and 23Co; 77.8Pt and 22.2Fe; and the ferrites such as barium ferrite, manganese zinc ferrite, manganese magnesium ferrite and so forth. Many of these materials have to be suitably treated such as by annealing, cold working, forging, etc., and sometimes in an electrical field, to produce their best magnetic properties. Of these materials it is preferred to use the iron, cobalt and nickel alloys and the ferrites. It, also, is preferred that the magnetic material used for the core have little or no retentivity and be highly permeable or have maximum permeability, so that sufficient magnetic intensity is directed onto the particles and so that the particles and core after de-energization of the coil will not cause smearing or shifting of the pattern due to the presence of residual magnetism. The cores can be solid or be laminated; they also can be made by powdered metallurgical methods. The magnetic or magnetizable particles can be made by methods well known in the art such as by spraying, micropulverizing, etc., can be acicular in shape, irregular, or can have other shapes and can have an average particle size of from about 0.001 to 80 microns. The pole face, cores or tips of the magnets can have many shapes as shown herein. They, also, can have dots on the pole pieces to increase the dot patterns on the material reproduced.

In addition to printing and copying as described supra, the process of the present invention can be used for coating and impregnating applications. For example, polishing cloth can be made by impregnating cloths with a substantial amount of magnetic particles. Also, a disinfectant, deodorant, fertilizer, pesticide, developing chemical can be mixed with the magnetic particles, preferably with a binder, such as a readily decomposable, hydrolyzable or water soluble etc. compound such as gelatin, polyvinyl alcohol, polyethylene glycol and the like (for later release of the disinfectant etc. on use) and employed to impregnate cloth or paper to make a paper product which contains a disinfectant. Since the magnetic particles can be driven into and throughout the fibers of paper or cloth, increased loading and extended service life and potency are thereby provided and which represents a distinct improvement over conventional wet impregnating processes. The present process can be used to provide decorative patterns on paper napkins, bathroom tissue, cleaning tissue and so forth.

By using one or more of the various binders discussed herein including polyethylene, polyvinyl chloride, polyvinyl chloride-vinyl acetate copolymers, polyacrylates, phenol or resorcinol-aldehyde resins, polyesters, acrylonitrile-butadiene-styrene copolymers, vinylidene chloride polymers, polypropylene, polystyrene, cellulosic polymers, polyurethane and other thermoplastic or thermosetting materials and a pigment, colored magnetic particles can be made. Still other thermoadhesive polymers or resins can be used as binders such as rosin, gum, copal, "Vinsol," Egyptian asphalt, hydrocarbon resins and the like. The binder can be dissolved in solvent, mixed with the pigment and magnetic particle and spray dried. In another method the ingredients are mixed, preferably hot, cooled and micropulverized. Where the binder, magnetic particle and pigment exhibit the tribo-electric effect, simple mixing may be sufficient to properly coat the magnetic particles with pigment and binder particles. Conventional compounding ingredients can be mixed with the resins or during preparation of the colored particles as desired such as antidegradants, stabilizers, curing agents if necessary, and so forth. Only sufficient binder is used to combine the pigment and magnetic particles; greater amounts can be used if desired. Generally the binder can be used in an amount of from about 10 to 75 parts per 100 parts by weight total of pigment and magnetic particles. The completed pigment-binder-magnetic particle can have an average particle size of from about 0.01 to 100 microns or larger. The color pigment is used in amounts sufficient to obtain the desired color and mask the color of the magnetic particles if dark or black. Large excess should not be used as such may interfere with cloud and magnetic pattern formation. The pigment particles can be of the same size as the magnetic particles but preferably are smaller in order to coat or substantially coat the magnetic particles. Various color pigments can be used including carbon black, ultramarine blue, chrome oxide, cadmium orange, molybdate orange, cadmium reds, Cd-Hg sulfide reds; CoSi violets, calcium carbonate, titanium dioxide, zinc sulfide, phthalocyanine blues, phthalocyanine greens, Amaplast orange LF, the Monastral Reds, the Benzidine and Amaplast yellows and so forth. Still other pigments can be used as shown in "Materials and Compounding Ingredients for Rubber and Plastics," 1965, Rubber World, New York, N.Y.

The process of the present invention can be used to imprint a serial number of a label which has been printed by a different method. Thus, this process can be used to provide various indicia and decorations on different printed media. In the case where the magnetic particles do not stick too well to the object to be printed such as certain coated papers, cold plastic, glass, ceramic, etc., the magnetic pattern can be sprayed with lacquer or enamel, or it can be laminated or coated by using a doctor blade, or by extruding a coating material on it, covering with transparent or translucent film, glassine or other suitable coating and so forth.

In addition to some of the other advantages mentioned herein, the magnetic printing process of the present invention provides means for dry printing without special paper or plastics of any sort, holding to the apparent public preference for, and several technical advantages of, dry processing with ordinary paper. In the area of reproduction, the methods of this invention and in particular those of FIGS. 30–38 and 41–42 would not be bothered by the limitation inherent in some electrostatic processes. Magnetic fields are not distorted by the presence of paper or plastics and such fields cannot be generated by "friction" effects. Magnetic fields are not affected by humidity, and the need for sensitive image plates and other fragile devices is eliminated.

There would appear to be no need for any voltages higher than ordinary line voltages (110 or 220) in magnetic printing equipment, and all-transistor electronics can be used. In contrast to the need for high voltages in electrostatic equipment, this feature can reduce certain space requirements, improve safety considerations, and maintenance. By suitably controlling fringing and aggregation, as disclosed herein, the tendency for magnetic particles to transfer or even intensify the magnetic field could promote collection of thicker particle patterns than realized with electrostatics, thereby contributing to opacity. A number of auxiliary arrangements using induction heating of the particles used for magnetic printing have been disclosed herein. In some cases, the magnetizing elements can also serve as induction heating devices. Although iron oxide and other heatable particles can be used for electrostatic printing, separate coils or other elements would be needed to produce induction heating of those particles. Furthermore, the process and apparatus of the present invention can be used in any system in which the information can be converted to time-sequential individual signals (i.e., "digital") and can be suitable for remote or facsimile-type use, i.e., telegraph or by broadcasting (facsimile). In other words, amplifier 206 of FIG. 30, 219 of FIG. 32, and 246 of FIG. 39, can be part of a telegraph system or broadcast system to transmit the information to a distant station where the incoming signals are then used eventually after suitable amplification to operate a magnetic core or magnetic scanning array to cause printing, etc. The processes and methods disclosed herein have applications in the fields of printing, publications, communication systems, computation and business machines, copying, impregnating, coating, packaging, textiles, special papers and so forth.

In a more generic sense, the non-magnetic particle receiving material can be described as non-polaristic and the magnetic particles can be described as polaristic particles and the through-field may then be described as non-gravitational so long as it applies a force which is attractive to the polaristic particles and so long as the field is not distorted by the non-polaristic material which receives the particles. These definitions are provided to support the claim language.

It will be understood that various changes in the details, materials, steps and arrangements of parts, which have been herein described and illustrated in order to explain the nature of the invention may be made by those skilled in the art within the principle and scope of the invention as expressed in the appended claims.

What is claimed is:

1. A method for indelibly marking, impregnating, printing or coating a porous surface of a member of substantially non-magnetic material, said method comprising freely distributing pulverized magnetic particles at regions in the vicinity of the porous surface of the member and forming a high frequency alternating polarity magnetic through-field that passes through said member and applies attractive force on said particles of a value several times the value required to effect simple transfer deposit of the particles to drive said particles against said porous surface and indelibly lodge said particles in the material of said member.

2. The method of claim 1 wherein said magnetic through-field is formed by application of systematic electrical signals to form individually originating through-fields in an organized pattern determined by said systematic electrical signals.

3. A method in accordance with claim 1 wherein the magnetic through-field is formed with a predetermined shape to lodge said particles in a pattern corresponding to said shape.

4. A method in accordance with claim 1 wherein said member is paper.

5. A method in accordance with claim 1 wherein said particles are pulverized barium ferrite.

6. A method in accordance with claim 1 and including positioning an edged field plate adjacent said surface to concentrate said through-field at said surface and thereby facilitate formation of field strength sufficient to achieve indelible lodging of said particles.

7. A method in accordance with claim 1 and wherein said frequency is about 1 kc. or more.

8. A method in accordance with claim 1 and wherein said frequency is between about 1 kc. and about 10 kc.

9. A method in accordance with claim 1 and wherein said member is paper, said particles are pulverized barium ferrite, said frequency is between about 1 kc. and about 10 kc. and said method includes positioning an edged field plate adjacent said surface to concentrate said through-field at said surface and thereby facilitate formation of field strength sufficient to achieve indelible lodging of said particles.

10. A method in accordance with claim 1 and wherein said magnetic through-field is formed as a plurality of individually originating magnetic through-fields each passing through a separate region of said member.

11. A method in accordance with claim 1 wherein said magnetic through-field is formed by application of electrical signals to form a one-dimensional array of individually originating through-fields, each of high frequency and each passing through a separate region of said member, said method including positioning an edged field plate adjacent each of said separate regions to concentrate each through-field at said surface and thereby facilitate formation of field strengths sufficient to achieve indelible lodging of said particles.

12. A method of indelibly marking, impregnating, printing or coating a porous surface of a member of substantially non-polaristic material which comprises freely distributing pulverized polaristic particles across regions in the vicinity of the porous surface of the member and forming a high frequency alternating polarity non-gravitational through-field of force that passes through said member and applies attractive force on said particles of a value several times the value required to effect simple transfer deposit of the particles to drive said particles against said porous surface and indelibly lodge said particles in the material of said member.

13. A method in accordance with claim 12 wherein said member is paper, said frequency is between about 1 kc. and about 10 kc. and said method includes positioning an edge field plate adjacent said surface to concentrate said through-field at said surface and thereby facilitate formation of field strength sufficient to achieve indelible lodging of said particles.

14. An apparatus for marking, impregnating, printing and the like upon a porous surface of substantially nonmagnetic member and comprising means for freely distributing finely divided pulverized magnetic particles in the vicinity of one surface of said member and field pole means for forming a high frequency alternating polarity magnetic through-field of predetermined shape extending into said surface and passing through said member and being of a strength several times the strength required to effect simple transfer deposit of the particles to apply attractive force on the distributed particles and drive said particles against said surface to indelibly lodge in the member in a pattern determined by said through-field.

15. An apparatus in accordance with claim 14 wherein said energizing means provides a high frequency alternating magnetic through-field of between about 1 kc. and about 10 kc.

16. An apparatus in accordance with claim 14 wherein said field pole means comprises an array of correspondingly oriented magnetic field poles adjacent the opposite surface of said member and means for energizing said field poles for providing individually originating magnetic through-fields each passing through a different region of said member.

17. An apparatus in accordance with claim 14 and including means for intermittently energizing said field pole means for forming said magnetic through-field and means for creating relative scanning movement between said member and said through-field in timed relation to the formation of said through-field.

18. An apparatus in accordance with claim 16 wherein said array comprises a linear set of magnetic field poles spanning said member, said apparatus including means for producing relative scanning movement between said array and said member and means for synchronizing actuation of said energizing means with said relative scanning movement.

19. An apparatus in accordance with claim 16 and including field pole means having a field concentrator edge positioned to face the first-named surface at a sufficient distance therefrom to effect concentration of the through-fields at and near the active regions of said field poles and thereby facilitate formation of field strengths sufficient to achieve permanent lodging of said particles.

20. An apparatus in accordance with claim 16 and including means for providing systematic electrical signals to said energizing means to control the intensity of said individually originating magnetic through-fields and cause said particles to deposit on said member in an oraginzed pattern determined by said systematic electrical signals.

21. An apparatus in accordance with claim 16 wherein each of said field poles comprises an electromagnet core and said energizing means comprises an individual coil for each core.

22. Apparatus in accordance with claim 16 wherein said means for energizing includes an array of photosensitive devices disposed in optical relation to an object having an image to be reproduced.

23. Apparatus in accordance with claim 22 wherein said array comprises at least two generally parallel rows of photocells, and a separate optical fiber associated with each photocell, said fibers having remote ends in row alignment.

24. Apparatus in accordance with claim 16 wherein said array of poles comprises at least two generally parallel rows of electromagnet cores, each core having an elongated end adjacent said member and encircled by an individual coil.

25. Apparatus in accordance with claim 24 wherein each elongated core end has a generally sharp point.

26. An apparatus in accordance with claim 20 and including means for creating relative scanning movement between said field pole means and said member in timed relation to said systematic electrical signals.

27. An apparatus in accordance with claim 20 and including field pole means having a field concentrator edge positioned to face the first-named surface of said member at a sufficient distance therefrom to effect concentration of the through-fields at and near the active regions of said field poles and thereby facilitate formation of field strengths sufficient to achieve indelible lodging of said particles.

28. An apparatus in accordance with claim 21 wherein said cores have tapered ends disposed adjacent said member in closely spaced relation.

29. An automatic one-step apparatus for indelible marking, impregnating, printing and the like upon a paper copy sheet and comprising means for freely distributing finely divided dry pulverized magnetic patricles in the vicinity of one surface of said sheet, field pole means for determining the shape of a magnetic through-field that is to extend into said surface and lead through said sheet for applying attractive force on the distributed particles and means for energizing the field pole means to produce a high frequency alternating polarity magnetic through-field of a strength several times the strength required to effect simple transfer deposit of the particles to apply attractive force on the distributed particles to cause at least some of said particles to be driven into said surface and indelibly lodged in the material of said sheet.

30. An apparatus in accordance with claim 29 wherein said field pole means comprises an array of correspondingly oriented magnetic field poles adjacent the opposite surface of said sheet and said energizing means includes separate means for each field pole for providing individually originating magnetic through-fields each intercepting a different region of said sheet.

31. An apparatus in accordance with claim 29 and including means for intermittently energizing said field pole means for forming said magnetic through-field and means for creating relative scanning movement between said sheet and said through-field in timed relation to the formation of said through-field.

32. An apparatus in accordance with claim 30 wherein said array comprises a linear set of magnetic field poles spanning said sheet, said apparatus including means for producing relative scanning movement between said array and said sheet and means for synchronizing actuation of said energizing means with said relative scanning movement.

33. An apparatus in accordance with claim 30 and including field pole means having a field concentrator edge positioned to face the first-named surface at a sufficient distance therefrom to effect concentration of the through-fields at and near the active regions of the field poles and thereby facilitate formation of field strengths sufficient to achieve indelible lodging of said particles.

34. An apparatus in accordance with claim 30 and including means for providing systematic electrical signals to said energizing means to control the intensity of said individually originating magnetic through-fields and cause said particles to deposit on said sheet in an organized pattern determined by said systematic electrical signals.

35. An automatic one-step apparatus for indelible markings, impregnating, printing, coating and the like upon a receiver member of a non-magnetic material that has a surface characterized by interstices and comprising means for freely distributing finely divided dry pulverized magnetic particles in the vicinity of said surface of said member, field pole means for determining the shape of a magnetic through-field that is to extend into said surface and through said member for applying attractive force on the distributed particles and means for energizing the field pole means to produce a high frequency alternating polarity magnetic through-field of a strength several times the strength required to effect simple transfer deposit of the particles to apply attractive force on the distributed particles to cause at least some of said particles to be driven into said surface and indelibly lodged in the material of said member.

36. An apparatus in accordance with claim 35 wherein the field pole means comprises an array of correspondingly oriented magnetic field poles adjacent to the opposite surface of said sheet and said energizing means includes separate means for each field pole for providing individually originating magnetic through-fields each intercepting a different region of said sheet and wherein said apparatus includes field pole means having a field concentrator edge positioned to face the first-named surface at a sufficient distance therefrom to effect concentration of the through-fields at and near the active regions of the field poles and thereby facilitate formation of field strengths sufficient to achieve indelible lodging of said particles.

37. An apparatus for indelible marking, impregnating, printing or coating a surface of a paper sheet and the like with finely divided magnetic particles comprising means for providing finely divided pulverized magnetic particles adjacent said surface, and means for forming a high frequency alternating polarity magnetic field that passes through said sheet at a strength several times the strength required to effect simple transfer deposit of the particles, whereby said field drives said magnetic particles against said surface to indelibly lodge in said sheet.

38. The apparatus of claim 37 containing additionally magnetic field shape determining means to cause said magnetic particles to deposit on said sheet with a substantial portion of said magnetic particles indelibly lodged in said sheet in a pattern corresponding to a magnetic field of predetermined shape.

References Cited

UNITED STATES PATENTS

| | | | |
|---|---|---|---|
| 3,161,544 | 12/1964 | Berry | 118—637 |
| 3,279,367 | 10/1966 | Brown. | |
| 3,355,743 | 11/1967 | Capps | 346—74 |
| 3,389,398 | 6/1968 | Engstrom et al. | 101—1 |
| 2,716,826 | 8/1955 | Huebner. | |

FOREIGN PATENTS

| | | |
|---|---|---|
| 733,484 | 7/1955 | Great Britain. |

OTHER REFERENCES

Magnetic Materials in the Electrical Industry, Bardell, MacDonald & Co. Ltd., London, August 1961.

ROBERT L. GRIFFIN, Primary Examiner

D. E. STOUT, Assistant Examiner

U.S. Cl. X.R.

101—426; 346—74

UNITED STATES PATENT OFFICE

CERTIFICATE OF CORRECTION

Patent No. 3,526,708 Dated September 1, 1970

Inventor(s) Alfred F. Leatherman

It is certified that error appears in the above-identified patent and that said Letters Patent are hereby corrected as shown below:

Column 5, line 4, "12" should read -- 13 --. Column 10, line 13, "88c" should read -- 88e --. Column 15, line 71, "170." should read -- 170, --. Column 16, line 53, "179a" should read -- 170a --. Column 20, line 5, "21" should read -- 217 --. Column 29, line 37, "edge" should read -- edged --; line 54, "energizing means provides" should read -- field pole means includes energizing means to provide --.

Signed and sealed this 5th day of January 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
☆ U.S. GOVERNMENT PRINTING OFFICE : 1969 O—366-334